(12) United States Patent
Iwai

(10) Patent No.: US 11,208,966 B2
(45) Date of Patent: Dec. 28, 2021

(54) FUEL PRESSURE ESTIMATION SYSTEM

(71) Applicant: TOYOTA JIDOSHA KABUSHIKI KAISHA, Toyota (JP)

(72) Inventor: Akira Iwai, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/238,725

(22) Filed: Apr. 23, 2021

(65) Prior Publication Data
US 2021/0363933 A1    Nov. 25, 2021

(30) Foreign Application Priority Data

May 21, 2020    (JP) .............................. JP2020-089238

(51) Int. Cl.
| | | |
|---|---|---|
| F02M 59/10 | (2006.01) | |
| F02D 41/30 | (2006.01) | |
| F02D 41/24 | (2006.01) | |
| F02D 41/32 | (2006.01) | |

(52) U.S. Cl.
CPC ..... *F02D 41/2487* (2013.01); *F02D 41/2422* (2013.01); *F02D 41/3094* (2013.01); *F02D 41/32* (2013.01); *F02M 59/102* (2013.01); *F02D 2200/0604* (2013.01); *F02D 2200/0625* (2013.01); *F02D 2200/101* (2013.01); *F02D 2250/31* (2013.01)

(58) Field of Classification Search
CPC .. F02D 41/2422; F02D 41/3094; F02D 41/32; F02D 2200/0604; F02D 2200/101; F02D 2250/31; F02M 59/102

USPC .......................... 701/104, 115; 123/431, 508
See application file for complete search history.

(56) References Cited

U.S. PATENT DOCUMENTS

| | | | | |
|---|---|---|---|---|
| 6,085,727 | A * | 7/2000 | Nakano ................ | F02M 47/027 123/447 |
| 6,349,702 | B1 * | 2/2002 | Nishiyama .......... | F02D 41/3836 123/447 |
| 7,267,106 | B2 * | 9/2007 | Adachi ............... | F02D 41/3836 123/436 |
| 7,789,068 | B2 * | 9/2010 | Serra .................... | F02M 59/102 123/446 |
| 2001/0032619 | A1 * | 10/2001 | Nishiyama ............ | F02D 41/401 123/456 |
| 2009/0082939 | A1 * | 3/2009 | Lihoshi ............... | F02D 41/3845 701/103 |

(Continued)

FOREIGN PATENT DOCUMENTS

| | | |
|---|---|---|
| EP | 3 199 789 A1 | 8/2017 |
| JP | 2016-058794 A | 4/2016 |

*Primary Examiner* — Erick R Solis
(74) *Attorney, Agent, or Firm* — Finnegan, Henderson, Farabow, Garrett & Dunner, LLP

(57) ABSTRACT

A storage device is configured to store a first mapping that receives, as an input, a first input variable including a cam phase variable on present and past phases of a cam, and output a pulsating variable on a pulsating component. The execution device is configured to acquire the first input variable and estimate the pulsating variable by applying the acquired first input variable to the first mapping. Therefore, it is possible to estimate the pulsating variable without providing a low-pressure fuel pressure sensor by estimating a fuel pressure variable by applying the first input variable to the first mapping.

6 Claims, 16 Drawing Sheets

(56) References Cited

U.S. PATENT DOCUMENTS

2016/0076475 A1     3/2016   Suzuki et al.
2016/0363104 A1    12/2016   Sanborn et al.

\* cited by examiner

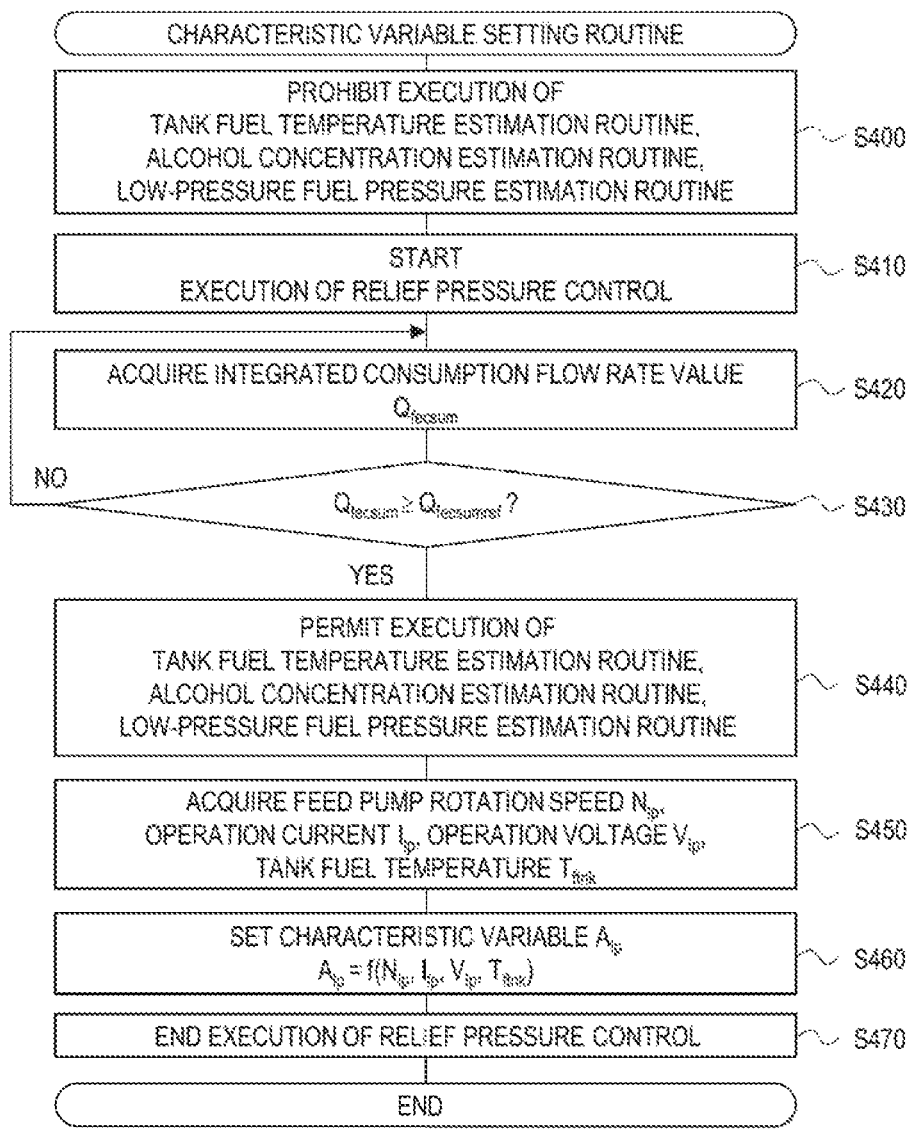
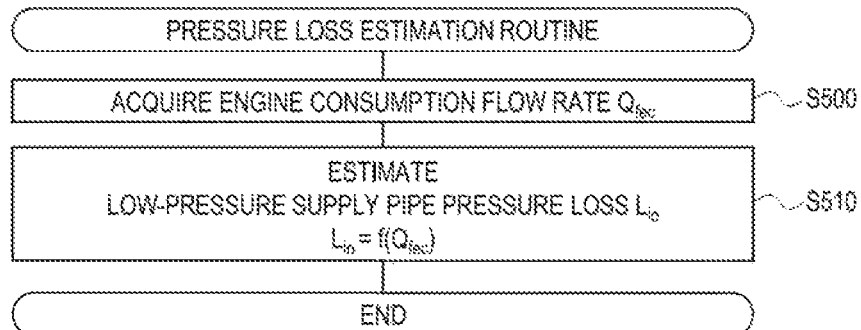

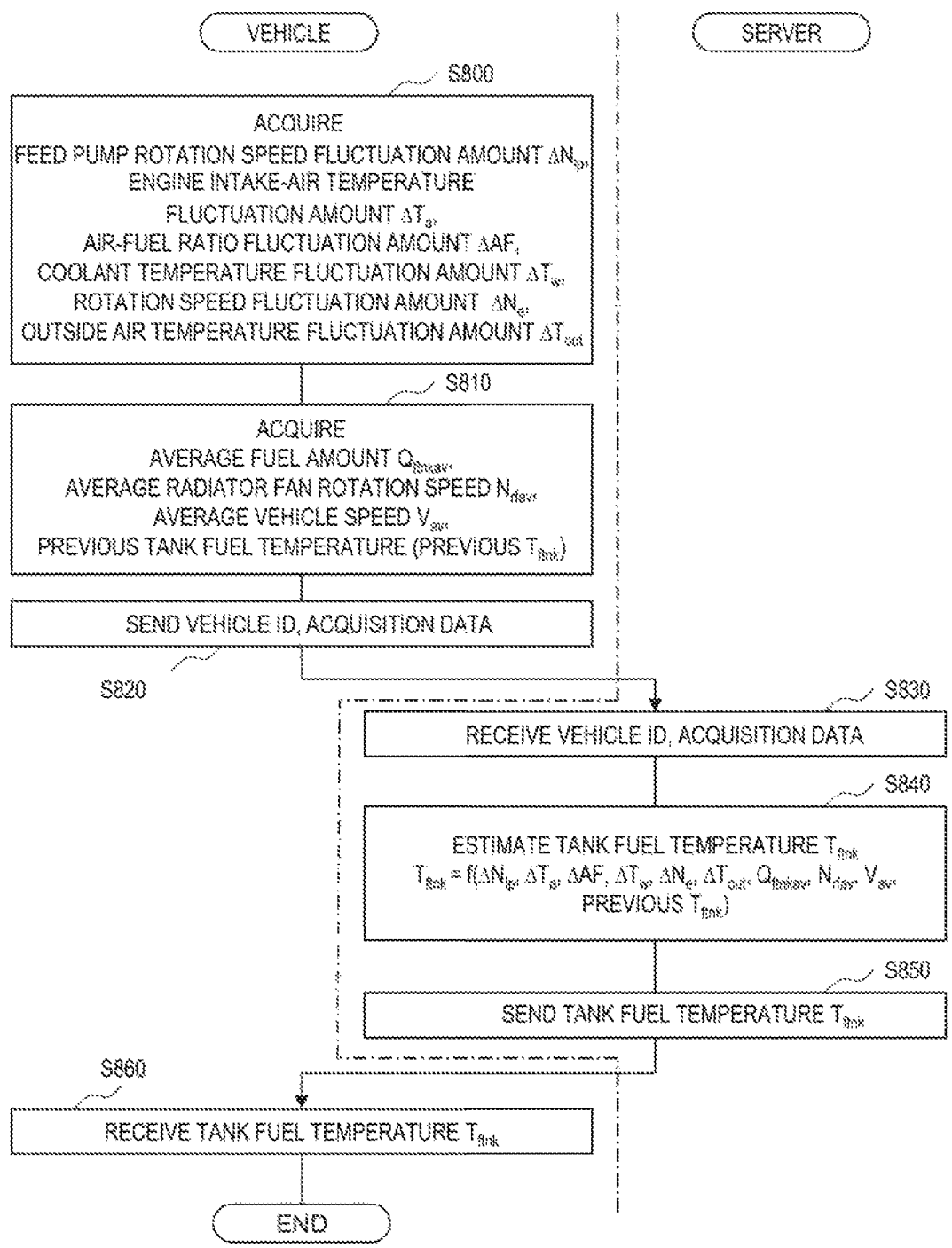

FUEL PRESSURE ESTIMATION SYSTEM

CROSS-REFERENCE TO RELATED APPLICATION

This application claims priority to Japanese Patent Application No. 2020-089238 filed on May 21, 2020, incorporated herein by reference in its entirety.

BACKGROUND

1. Technical Field

The present disclosure relates to a fuel pressure estimation system.

2. Description of Related Art

As this type of technology, an engine apparatus is proposed which includes a port injection valve and a cylinder injection valve, a feed pump that supplies fuel in a fuel tank to a low-pressure supply pipe connected to the port injection valve, a high-pressure pump that is driven by a cam rotating with rotation of an engine, pressurizes the fuel in the low-pressure supply pipe, and supplies the fuel to a high-pressure supply pipe connected to the cylinder injection valve, and a low-pressure fuel pressure sensor that detects a pressure of the fuel (a low-pressure fuel pressure) in the low-pressure supply pipe (see, for example, Japanese Unexamined Patent Application Publication No. 2016-56794). In the engine apparatus, the low-pressure fuel pressure sensor detects a pulsating component of the low-pressure fuel pressure caused by an operation of the high-pressure pump.

SUMMARY

In the above-described engine apparatus, it is necessary to provide the low-pressure fuel pressure sensor in order to recognize the pulsating component in the low-pressure fuel pressure. In recent years, from the viewpoint of reducing the number of components and costs, it has been required to devise a method of estimating a low-pressure fuel pressure without using a low-pressure fuel pressure sensor. However, until now, an appropriate method has not been devised.

A fuel pressure estimation system according to the present disclosure makes it possible to estimate a pulsating component of a low-pressure fuel pressure without providing a low-pressure fuel pressure sensor.

A fuel pressure estimation system according to the present disclosure employs the following configuration.

A fuel pressure estimation system according to one aspect of the present disclosure is configured to estimate a pulsating variable on a pulsating component of a low-pressure fuel pressure, which is a pressure of fuel in a low-pressure supply pipe for an engine apparatus including a cylinder injection valve that injects fuel in a cylinder, and a fuel supply device that has a fuel pump and a high-pressure pump. The fuel pump supplies the fuel in a fuel tank to the low-pressure supply pipe and the high-pressure pump pressurizes the fuel in the low-pressure supply pipe by a plunger, which is driven according to rotation of a cam, and supplies the fuel to a high-pressure supply pipe connected to the cylinder injection valve. The fuel pressure estimation system includes a storage device configured to store a first mapping that receives, as an input, a first input variable including a cam phase variable on present and past phases of the cam, and outputs the pulsating variable on the pulsating component, and an execution device configured to acquire the first input variable and estimate the pulsating variable by applying the first input variable to the first mapping.

In the above aspect, the storage device stores the first mapping that receives, as the input, the first input variable including the cam phase variable on the present and past phases of the cam, and outputs the pulsating variable on the pulsating component. The execution device acquires the first input variable and estimates the pulsating variable by applying the acquired first input variable to the first mapping. Through experiments, analysis, and the like, the inventors found that the cam phase variable has a relationship with the pulsating component (that is, the former influences the latter). Therefore, it is possible to estimate the pulsating variable without providing a low-pressure fuel pressure sensor by estimating the fuel pressure variable by applying the first input variable to the first mapping. Here, the first mapping and each of the following mappings may be determined by machine learning or through experiments, analysis, or the like by humans.

In the above aspect, the first input variable may further include at least a part of an engine rotation speed variable on present and past rotation speeds of an engine, a load factor variable on present and past load factors of the engine, a high-pressure discharge flow rate variable on present and past discharge flow rates of the high-pressure pump, and a high-pressure fuel pressure variable on present and past fuel pressures in the high-pressure supply pipe.

In the above aspect, the storage device may further store a second mapping that receives, as an input, second input variables including a pump variable on a state of the fuel pump, a consumption flow rate variable on a consumption flow rate of the fuel of the engine, and a property variable on a property of the fuel, and outputs a base value variable on a base value of the low-pressure fuel pressure. The execution device may acquire the second input variables and estimate the base value variable by applying the second input variables to the second mapping. Through experiments, analysis, and the like, the inventors found that the pump variable, the consumption flow rate variable, and the property variable have a relationship with the base value variable. Therefore, it is possible to estimate the base value variable without providing a low-pressure fuel pressure sensor by applying the second input variables to the second mapping.

In the above aspect, the second input variables may include at least one of a fuel amount variable on a fuel amount in the fuel tank, an internal pressure variable on a tank internal pressure, which is a pressure in the fuel tank, a relief pressure-associated variable, which is the pump variable and the property variable when a relief pressure control for driving the fuel pump such that a relief valve is opened is executed, a characteristic variable on a characteristic of the fuel pump, and a pressure loss variable on a pressure loss of the fuel in the low-pressure supply pipe.

In the above aspect, the storage device may store a third mapping that receives, as an input, at least the base value variable and the pulsating variable, and outputs a low-pressure fuel pressure variable on a behavior of the low-pressure fuel pressure including the base value and the pulsating component of the low-pressure fuel pressure. The execution device may estimate the low-pressure fuel pressure variable by applying at least the base value variable and the pulsating variable to the third mapping. In this manner, it is possible to estimate the low-pressure fuel pressure variable by applying at least the base value variable and the pulsating variable to the third mapping.

In the above aspect, the execution may include a first execution device mounted on a vehicle and a second execution device arranged outside the vehicle. The first execution device may acquire acquisition data including the first input variable, send the acquisition data to the second execution device, and receive estimation data from the second execution device. The second execution device may receive the acquisition data, estimate, from the acquisition data, the estimation data including the fuel pressure variable, and send the estimation data to the first execution device. In this manner, it is possible to reduce a processing load on the first execution device.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 5 is a flowchart illustrating an example of a characteristic variable setting routine;

FIG. 6 is a flowchart illustrating an example of a pressure loss estimation routine;

FIG. 21 is a flowchart illustrating an example of a flow of processing the electronic control unit and the server when estimating a tank fuel temperature.

DETAILED DESCRIPTION OF EMBODIMENTS

Hereinbelow, an example of the present disclosure will be described using embodiments.

Figure 1:
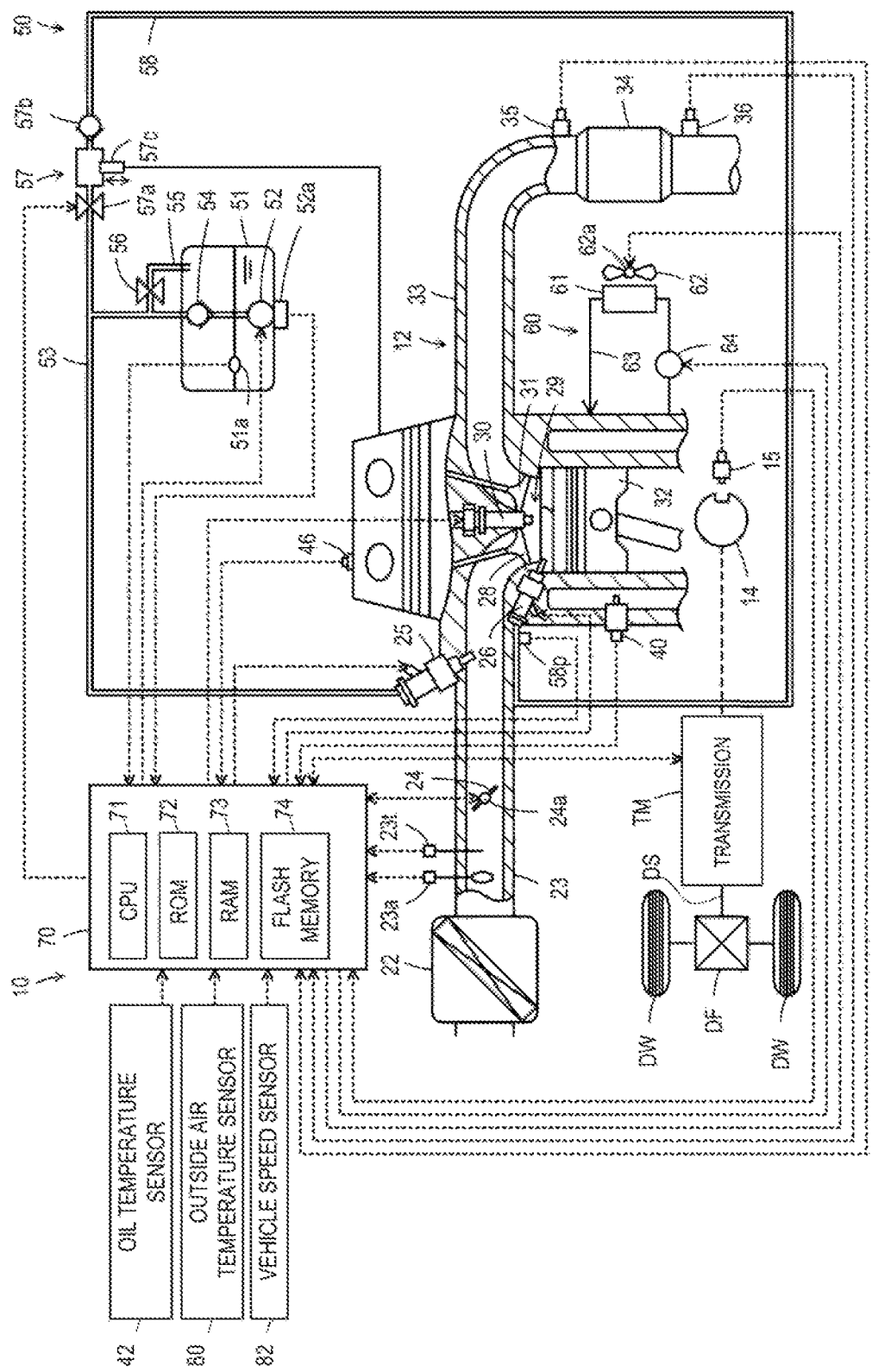
FIG. 1 is a block diagram illustrating a schematic configuration of a first vehicle on which a fuel pressure estimation system is mounted as an example of the present disclosure.

FIG. 1 is a block diagram illustrating a schematic configuration of a vehicle 10 on which a fuel pressure estimation system is mounted as an embodiment of the present disclosure. As illustrated in FIG. 1, the vehicle 10 in the embodiment is provided with an engine 12, a fuel supply device 50, a cooling device 60, a transmission TM that changes power from the engine 12 and transmits the power to a drive shaft DS connected to drive wheels DW via a differential gear DF, and an electronic control unit 70. The vehicle 10 may be configured as a hybrid vehicle having a motor in addition to the engine 12. In the embodiment, the "fuel pressure estimation system" corresponds to the electronic control unit 70.

The engine 12 is configured as an internal combustion engine that outputs power using fuel, such as gasoline or light oil. The engine 12 has a port injection valve that injects fuel into an intake-air port and a cylinder injection valve 26 that injects fuel into a cylinder. The port injection valve 25 and the cylinder injection valve 26 enable the engine 12 to be driven in any of port injection mode, cylinder injection mode, and shared injection mode.

In the port injection mode, the air cleaned by an air cleaner 22 is taken into an intake-air pipe 23 and passes through a throttle valve 24, and fuel is injected from the port injection valve 25 to mix the air with the fuel. Then, the air-fuel mixture is taken into a combustion chamber 29 via an intake-air valve 28, and is explosively combusted by an electric spark from a spark plug 30. Then, a reciprocating motion of a piston 32 pushed down by the energy generated by the explosive combustion is converted into a rotational motion of a crankshaft 14. In the cylinder injection mode, the air is taken into the combustion chamber 29 in the same manner as in the port injection mode, and the fuel is injected from the cylinder injection valve 26 during intake-air stroke or at the start of compression stroke. Then, the fuel is explosively combusted by an electric spark from the spark plug 30 and the rotational motion of the crankshaft 14 is obtained. In the shared injection mode, fuel is injected from the port injection valve 25 when the air is taken into the combustion chamber 29, and the fuel is injected from the cylinder injection valve 26 during the intake-air stroke or the compression stroke. Then, the fuel is explosively combusted by an electric spark from the spark plug 30 and the rotational motion of the crankshaft 14 is obtained. These injection mode types are switched therebetween according to a driving state of the engine 12. Exhaust gas discharged from the combustion chamber 29 via an exhaust valve 31 to an exhaust pipe 33 is discharged to the outside air via an exhaust gas control device 34 having an exhaust gas control catalyst (a three-way catalyst) that removes harmful components, such as carbon monoxide (CO), hydrocarbon (HC), or nitrogen oxides ($NO_x$).

The fuel supply device 50 is configured to supply the fuel in the fuel tank 51 to the port injection valve 25 or the cylinder injection valve 26 of the engine 12. The fuel supply device 50 is provided with a fuel tank 51, a feed pump 52, a low-pressure supply pipe 53, a check valve 54, a relief flow path 55, a relief valve 56, a high-pressure pump 57, and a high-pressure supply pipe 58.

The feed pump 52 is configured as an electric pump that operates by receiving electric power supplied from a battery (not shown), and is arranged in the fuel tank 51. The feed pump 52 supplies the fuel in the fuel tank 51 to the low-pressure supply pipe 53. The low-pressure supply pipe 53 is connected to the port injection valve 25. The check valve 54 is provided in the low-pressure supply pipe 53, allows the fuel to flow from the feed pump 52 side to the port injection valve 25 side, and regulates the flow of the fuel in the reverse direction.

The relief flow path 55 is connected to the low-pressure supply pipe 53 and the fuel tank 51. The relief valve 56 is provided in the relief flow path 55, and is closed when the fuel pressure in the low-pressure supply pipe 53 is less than a threshold value $P_{floref}$ and opened when the fuel pressure in the low-pressure supply pipe 53 is equal to or greater than the threshold value $P_{floref}$. When the relief valve 56 is opened, a part of the fuel in the low-pressure supply pipe 53 is returned to the fuel tank 51 via the relief flow path 55. As such, it is possible to restrain the fuel pressure in the low-pressure supply pipe 53 from becoming excessive.

The high-pressure pump 57 is driven by power from the engine 12 (in the embodiment, rotation of an intake camshaft that opens/closes the intake-air valve 28), and is configured to pressurize the fuel in the low-pressure supply pipe 53 and supply the fuel to the high-pressure supply pipe 58. The high-pressure pump 57 has an electromagnetic valve 57a that is connected to an inlet of the high-pressure pump 57 and is opened/closed when pressurizing the fuel, a check valve 57b that is connected to an outlet of the high-pressure pump 57, regulates a reverse flow of the fuel and maintains the fuel pressure in the high-pressure supply pipe 58, and a plunger 57c that operates (moves in the up-down direction in FIG. 1) by the rotation of the engine 12 (the rotation of the intake camshaft). During the driving of the engine 12, the high-pressure pump 57 receives the fuel of the low-pressure supply pipe 53 when the electromagnetic valve 57a is opened, and pressurizes the fuel supplied to the high-pressure supply pipe 58 by intermittently feeding the fuel that has been compressed by the plunger 57c to the high-pressure supply pipe 58 via the check valve 57b when the electromagnetic valve 57a is closed. During the driving of the high-pressure pump 57, the fuel pressure in the low-pressure supply pipe 53 or the fuel pressure in the high-pressure supply pipe 58 (the pressure of the fuel) is pulsated according to the rotation of the engine 12 (the rotation of the intake camshaft). The high-pressure supply pipe 58 is connected to the cylinder injection valve 26.

The cooling device 60 is provided with a radiator 61, a radiator fan 62, a circulation flow path 63 of a coolant, and an electric pump 64. The radiator 61 exchanges heat between the coolant and the air. The radiator fan 62 blows air to the radiator 61. The circulation flow path 63 is formed so as to include the radiator 61 or the engine 12. The electric pump 64 is provided in the circulation flow path 63 and pumps the coolant.

The electronic control unit 70 is configured as a microcomputer having a CPU 71, a ROM 72, a RAM 73, a flash memory 74, and an input/output port. In the embodiment, an "execution device" corresponds to the CPU 71 and a "storage device" corresponds to the flash memory 74.

Signals from various sensors are input to the electronic control—unit 70 via the input port. Among the signals input to the electronic control unit 70, examples of the signals associated with the engine 12 can include a crank angle $\theta_{cr}$ from a crank position sensor 15 that detects a rotational position of the crankshaft 14 of the engine 12, a coolant temperature $T_w$ from a coolant temperature sensor 40 that detects the temperature of a coolant of the engine 12, an oil temperature $T_{oil}$ from an oil temperature sensor 42 that detects the temperature of lubricant of the engine 12, cam angles $\theta_{ci}$, $\theta_{co}$ from a cam position sensor 44 that detects a rotational position of the intake camshaft that opens/closes the intake-air valve 28 or a rotational position of an exhaust camshaft that opens/closes the exhaust valve 31, a throttle opening degree TH from a throttle position sensor 24a that detects a position of the throttle valve 24, an intake-air amount $Q_a$ from an air flow meter 23a mounted on the intake-air pipe 23, an intake-air temperature $T_a$ from a temperature sensor 23t mounted on the intake-air pipe 23, an air-fuel ratio AF from an air-fuel ratio sensor 35 mounted on the upstream side of the exhaust gas control device 34 of the exhaust pipe 33, or an oxygen signal $O_2$ from an oxygen sensor 36 mounted on the downstream side of the exhaust gas control device 34 of the exhaust pipe 33.

Among the signals input to the electronic control unit 70, examples of the signals associated with the fuel supply device 50 or the cooling device 60 can include a rotation speed $N_{fp}$ of the feed pump 52 from a state detection device 52a mounted on the feed pump 52, an operation current $I_{fp}$ and an operation voltage $V_{fp}$ supplied from a battery (not shown) to the feed pump 52, a fuel amount $Q_{ftnk}$ from a fuel amount sensor 51a that detects a fuel amount in the fuel tank 51, a high-pressure fuel pressure $P_{fhi}$ from a fuel pressure sensor 58p mounted in the vicinity of the cylinder injection valve 26 (for example, a high-pressure delivery pipe) of the high-pressure supply pipe 58 (the fuel pressure in the high-pressure supply pipe 58), or a rotation speed $N_{rf}$ of the radiator fan 62 from a rotation speed sensor 62a mounted on the radiator fan 62.

Among the signals input to the electronic control unit 70, examples of the signals other than those described above include a signal from the transmission TM, an outside air temperature $T_{out}$ from an outside air temperature sensor 80, a vehicle speed V from a vehicle speed sensor 82, an ignition signal 1G from an ignition switch (not shown), a shift position SP from a shift position sensor that detects an operation position of a shift lever (not shown), an accelerator opening degree $A_{cc}$ from an accelerator position sensor that detects an amount of depression of an accelerator pedal (not shown), or a brake position BP from a brake position sensor that detects an amount of depression of a brake pedal (not shown).

Various control signals are output from the electronic control unit 70 via the output port. Examples of the signals output from the electronic control unit 70 include a control signal to the throttle valve 24, a control signal to the port injection valve 25, a control signal to the cylinder injection valve 26, or a control signal to the spark plug of the engine 12, a control signal to the feed pump 52 of the fuel supply device 50, a control signal to the electromagnetic valve 57a of the high-pressure pump 57, a control signal to the radiator fan 62 or a control signal to the electric pump 64 of the cooling device 60, or a control signal to the transmission TM.

The electronic control unit 70 calculates a rotation speed $N_e$, a load factor KL, or torque $T_c$ of the engine 12. The rotation speed $N_e$ of the engine 12 is calculated based on the crank angle $\theta_{cr}$ from the crank position sensor 15. The load factor KL of the engine 12 is a ratio of a volume of the air that is actually taken in in one cycle to a stroke volume of the engine 12 per cycle, and is calculated based on the intake-air amount $Q_a$ from the air flow meter 23a and the rotation speed $N_e$ of the engine 12. The torque $T_c$ of the engine 12 is calculated (estimated) based on the throttle opening degree TH from the throttle position sensor 24a. Further, the electronic control unit 70 calculates consumption flow rates $Q_{fpc}$, $Q_{fdc}$ of the port injection valve 25 and the cylinder injection valve 26, or a consumption flow rate $Q_{fec}$ of the engine 12. The consumption flow rates $Q_{fpc}$, $Q_{fdc}$ of the port injection valve 25 and the cylinder injection valve 26 are calculated based on fuel injection amounts $Q_{fp}$, $Q_{fd}$ of the port injection valve 25 and the cylinder injection valve 26. The consumption flow rate $Q_{fec}$ of the engine 12 is calculated as the sum of the consumption flow rates $Q_{fpc}$, $Q_{fdc}$ of the port injection valve 25 and the cylinder injection valve 26.

In the vehicle 10 configured in this manner in the embodiment, during the driving of the engine 12, the CPU 71 of the electronic control unit 70 controls the intake-air amount, the fuel injection, or the ignition of the engine 12, and the feed pump 52 or the high-pressure pump 57 (the electromagnetic valve 57a) of the fuel supply device 50.

The intake-air amount of the engine 12 is controlled by, for example, setting a target intake-air amount $Q_a^*$ based on a target load factor KL* of the engine 12 which is based on the accelerator opening degree $A_{ec}$ and the vehicle speed V, setting a target throttle opening degree TH* such that a value of the intake-air amount $Q_a$ becomes equal to a value of the target intake-air amount $Q_a^*$, and controlling the throttle valve 24 using the target throttle opening degree TH*. The fuel injection is controlled by setting the injection mode for execution from among the port injection mode, the cylinder injection mode, and the shared injection mode based on the rotation speed $N_e$ and the load factor KL of the engine 12, setting target injection amounts $Q_{fp}^*$, $Q_{fd}^*$ of the port injection valve 25 and the cylinder injection valve 26 such that a value of the air-fuel ratio AF becomes equal to a value of a target air-fuel ratio AF* (for example, a stoichiometric air-fuel ratio) based on the intake-air amount $Q_a$ and the injection mode for execution, and controlling the port injection valve 25 and the cylinder injection valve 26 using the target injection amounts $Q_{fp}^*$, $Q_{fd}^*$. The ignition is controlled by setting a target ignition timing $T_i^*$ based on the rotation speed $N_e$ and the target load factor KL* of the engine 12 and controlling the spark plug 30 using the set target ignition timing $T_i^*$.

The fuel supply device 50 is controlled, for example, in the following manner. First, a target low-pressure fuel pressure $P_{flo}^*$ and a target high-pressure fuel pressure $P_{fhi}^*$, which are respective target values of a low-pressure fuel pressure and the high-pressure fuel pressure, are set based on the rotation speed $N_e$ and the target load factor KL* of the engine 12. The low-pressure fuel pressure and the high-pressure fuel pressure are pressures of the fuel in the low-pressure supply pipe 53 and the high-pressure supply pipe 58, respectively. Subsequently, a target discharge flow rate $Q_{flpo}^*$ or a target rotation speed $N_{lp}^*$ of the feed pump 52 is set such that a value of the low-pressure fuel pressure $P_{flo}$ becomes equal to a value of the target low-pressure fuel pressure $P_{flo}^*$, a target duty $D_{lp}^*$ of the feed pump 52 is set based on the target discharge flow rate $Q_{flpo}^*$ or the target rotation speed $N_{lp}^*$, and the feed pump 52 is controlled using the target duty $D_{lp}^*$. Further, the target discharge flow rate $Q_{flpo}^*$ of the high-pressure pump 57 is set such that a value of the high-pressure fuel pressure $P_{fhi}$ becomes equal to a value of the target high-pressure fuel pressure $P_{fhi}^*$, a target duty $D_{hp}^*$ of the electromagnetic valve 57a of the high-pressure pump 57 is set based on the target discharge flow rate $Q_{flpo}^*$, and the electromagnetic valve 57a is controlled using the target duty $D_{hp}^*$. For the low-pressure fuel pressure $P_{flo}$, a value estimated by a process to be described below is used, and for the high-pressure fuel pressure $P_{fhi}$, a value detected by the fuel pressure sensor 58p is used.

Next, an operation of the vehicle 10 configured in this manner in the embodiment will be described. Specifically, processes of estimating a tank fuel temperature $T_{ftnk}$, which is the temperature of the fuel in the fuel tank 51, an alcohol concentration $C_{fal}$ as the fuel type, or a tank internal pressure $P_{tnk}$, which is a pressure in the fuel tank 51, and a process of setting a characteristic variable $A_{lp}$ on characteristics (individual differences) of the feed pump 52 will be described. Further, a process of estimating a pressure loss $L_{lo}$ of the low-pressure supply pipe 53 or a process of estimating a high-pressure pump fuel temperature $T_{fhp}$, which is the temperature of the fuel on the low-pressure supply pipe 53 side of the high-pressure pump 57, will also be described. Further, a process of estimating the low-pressure fuel pressure $P_{flo}$, its base value $P_{flobs}$, or its pulsating component $P_{flopl}$ will also be described.

Figure 2:
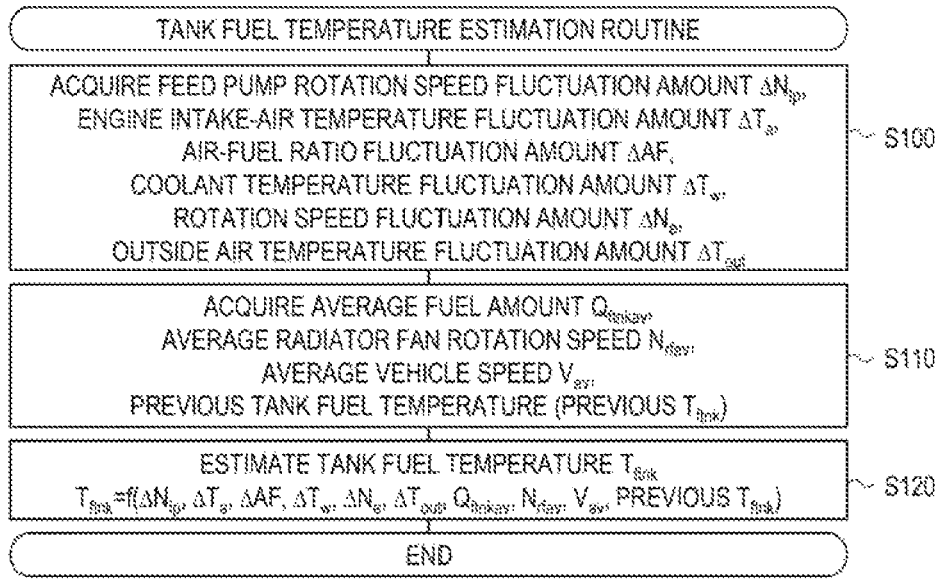
FIG. 2 is a flowchart illustrating an example of a tank fuel temperature estimation routine.
Figure 3:
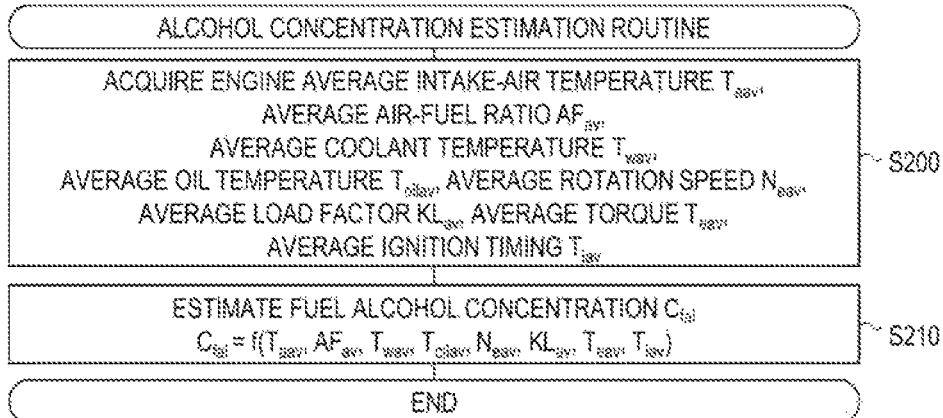
FIG. 3 is a flowchart illustrating an example of an alcohol concentration estimation routine.
Figure 4:
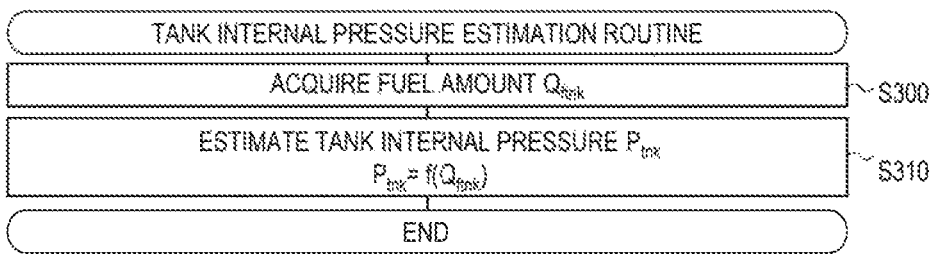
FIG. 4 is a flowchart illustrating an example of a tank internal pressure estimation routine.
Figure 7:
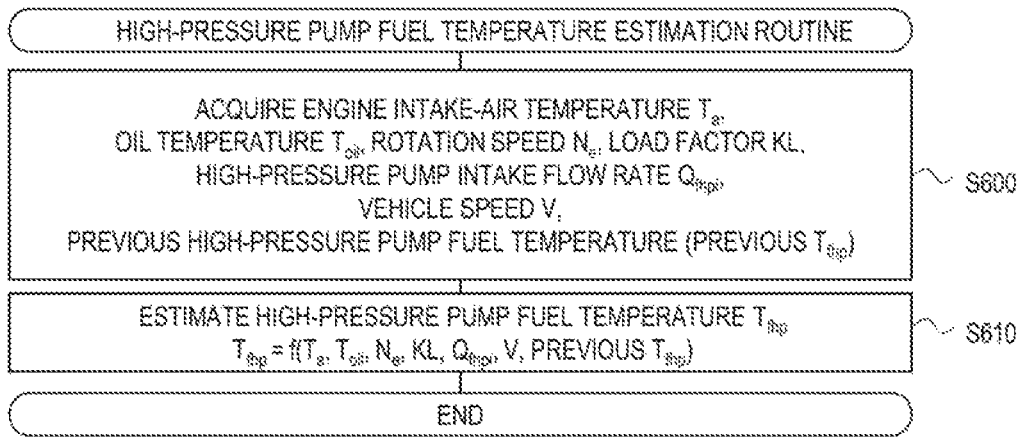
FIG. 7 is a flowchart illustrating an example of a high-pressure pump fuel temperature estimation routine.
Figure 8:
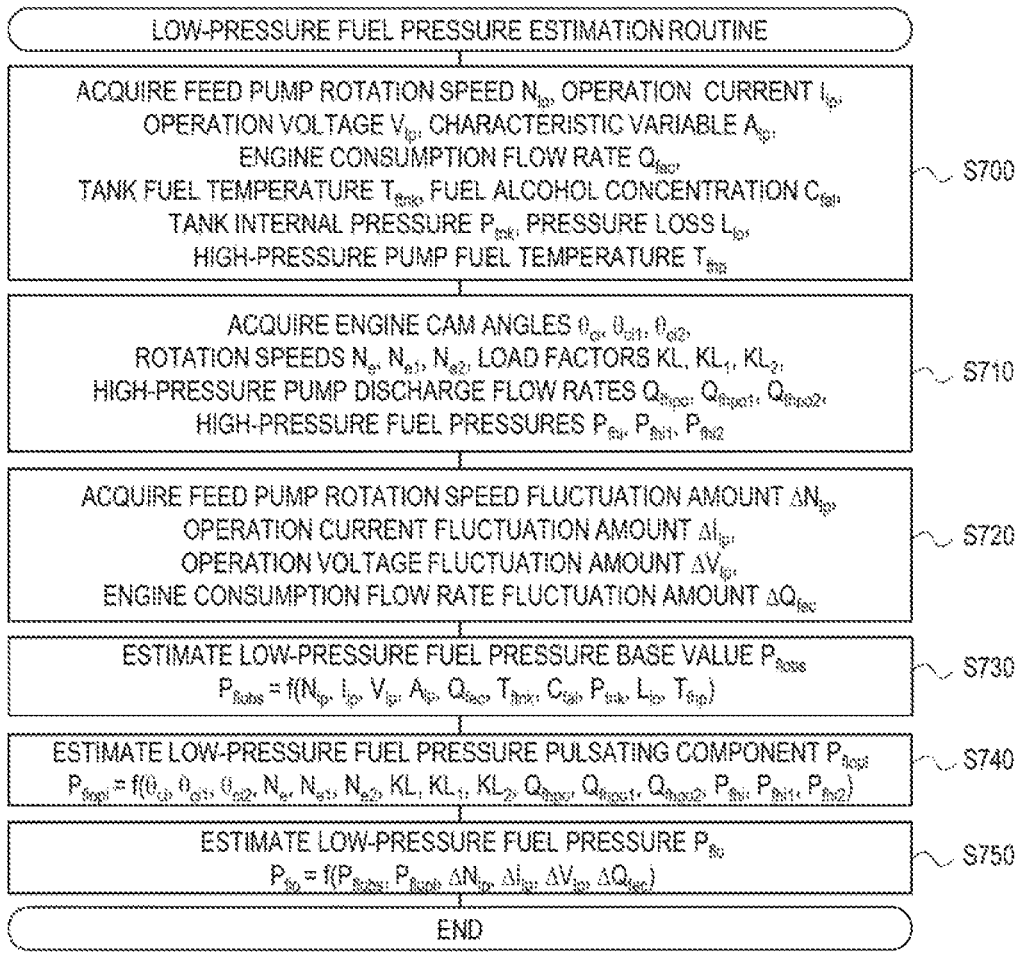
FIG. 8 is a flowchart illustrating an example of a low-pressure fuel pressure estimation routine.

FIG. 2 is a flowchart illustrating an example of a tank fuel temperature estimation routine. FIG. 3 is a flowchart illustrating an example of an alcohol concentration estimation routine. FIG. 4 is a flowchart illustrating an example of a tank internal pressure estimation routine, FIG. 5 is a flowchart illustrating an example of a characteristic variable setting routine. FIG. 6 is a flowchart illustrating an example of a pressure loss estimation routine. FIG. 7 is a flowchart illustrating an example of a high-pressure pump fuel temperature estimation routine. FIG. 8 is a flowchart illustrating an example of a low-pressure fuel pressure estimation routine. Each routine in FIGS. 2 to 8 is executed when the electronic control unit 70 reads out a program stored in the ROM 72. Hereinafter, the above processes will be described in order.

The process of estimating the tank fuel temperature $T_{ftnk}$ will be described using the tank fuel temperature estimation routine in FIG. 2. This routine is repeatedly executed by the electronic control unit 70 except when the execution is prohibited by the characteristic variable setting routine in FIG. 5. When the execution is prohibited by the characteristic variable setting routine in FIG. 5, in the embodiment, a previously estimated value for the tank fuel temperature $T_{ftnk}$ is maintained. In the tank fuel temperature estimation routine in FIG. 2, the CPU 71 of the electronic control unit 70 first acquires a rotation speed fluctuation amount $\Delta N_{lp}$ of the feed pump 52, an intake-air temperature fluctuation amount $\Delta T_a$, an air-fuel ratio fluctuation amount $\Delta AF$, a coolant temperature fluctuation amount $\Delta T_w$, or a rotation speed fluctuation amount $\Delta N_e$ of the engine 12, and an outside air temperature fluctuation amount $\Delta T_{out}$ (step S100).

In the embodiment, for each of the rotation speed fluctuation amount $\Delta N_{lp}$ of the feed pump 52, the intake-air temperature fluctuation amount $\Delta T_a$, the air-fuel ratio fluctuation amount $\Delta AF$, the coolant temperature fluctuation amount $\Delta T_w$, or the rotation speed fluctuation amount $\Delta N_e$ of the engine 12, and the outside air temperature fluctuation amount $\Delta T_{out}$, a value calculated as a fluctuation amount (a difference between the maximum value and the minimum value) for a predetermined time period $\Delta t_1$ is acquired using a sequential value for the predetermined time period $\Delta t_1$ (a value at each time from before the predetermined time period $\Delta t_1$ to the present) of each of the rotation speed $N_{lp}$ of the feed pump 52, the intake-air temperature $T_a$, the air-fuel ratio AF, the coolant temperature $T_w$, or the rotation speed $N_e$ of the engine 12, and the outside air temperature $T_{out}$. As the predetermined time period $\Delta t_1$, for example, about 20 seconds to 60 seconds is used.

Here, for the rotation speed $N_{fp}$ of the feed pump 52, a value detected by the state detection device 52a is acquired. For the intake-air temperature $T_a$ of the engine 12, a value detected by the air flow meter 23a is acquired. For the air-fuel ratio AF, a value detected by the air-fuel ratio sensor 35 is acquired. For the coolant temperature $T_w$, a value detected by the coolant temperature sensor 40 is acquired. For the rotation speed $N_e$, a value calculated based on the crank angle $\theta_{cr}$, which is detected by the crank position sensor 15, is acquired. For the outside air temperature $T_{out}$, a value detected by the outside air temperature sensor 80 is acquired.

Subsequently, the average fuel amount $Q_{ftnkav}$ in the fuel tank 51, the average rotation speed $N_{rfav}$ of the radiator fan 62, the average vehicle speed $V_{av}$, and a previously estimated tank fuel temperature (a previous $T_{ftnk}$) are acquired (step S110). In the embodiment, for each of the average fuel amount $Q_{ftnkav}$ in the fuel tank 51, the average rotation speed $N_{rfav}$ of the radiator fan 62, and the average vehicle speed $V_{av}$, a value calculated as the average value for the predetermined time period $\Delta t_1$ is acquired using a sequential value for the predetermined time period $\Delta t_1$ of each of the fuel amount $Q_{ftnk}$ in the fuel tank 51, the rotation speed $N_{rf}$ of the radiator fan 62, and the vehicle speed V. Here, for the fuel amount $Q_{ftnk}$ in the fuel tank 51, a value detected by the fuel amount sensor 51a is acquired. For the rotation speed $N_{rf}$ of the radiator fan 62, a value detected by the rotation speed sensor 62a is acquired. For the vehicle speed V, a value detected by the vehicle speed sensor 82 is acquired.

Then, the CPU 71 estimates the tank fuel temperature $T_{ftnk}$ using the rotation speed fluctuation amount $\Delta N_{fp}$ of the feed pump 52, the intake-air temperature fluctuation amount $\Delta T_a$, the air-fuel ratio fluctuation amount $\Delta AF$, the coolant temperature fluctuation amount $\Delta T_w$, or the rotation speed fluctuation amount $\Delta N_e$ of the engine 12, the outside air temperature fluctuation amount $\Delta T_{out}$ the average fuel amount $Q_{ftnkav}$ in the fuel tank 51, the average rotation speed $N_{rfav}$ of the radiator fan 62, the average vehicle speed $V_{av}$, and the previously estimated tank fuel temperature (the previous $T_{ftnk}$), all of which are acquired in steps S100 and S110, and a tank fuel temperature mapping (step S120), and then, ends this routine.

Here, the tank fuel temperature mapping receives, as an input, input variables including the rotation speed fluctuation amount $\Delta N_{fp}$ of the feed pump 52, the intake-air temperature fluctuation amount $\Delta T_a$, the air-fuel ratio fluctuation amount $\Delta AF$, the coolant temperature fluctuation amount $\Delta T_w$, or the rotation speed fluctuation amount $\Delta N_e$ of the engine 12, the outside air temperature fluctuation amount $\Delta T_{out}$, the average fuel amount $Q_{ftnkav}$ in the fuel tank 51, the average rotation speed $N_{riiav}$ of the radiator fan 62, the average vehicle speed $V_{av}$, and the previously estimated tank fuel temperature (the previous $T_{ftnk}$), and outputs the tank fuel temperature $T_{ftnk}$. The tank fuel temperature mapping is stored in the flash memory 74.

The process for step S120 is executed by setting, as input variables x[1] to x[10] of the tank fuel temperature mapping, the rotation speed fluctuation amount $\Delta N_{fp}$ of the feed pump 52, the intake-air temperature fluctuation amount $\Delta T_a$, the air-fuel ratio fluctuation amount $\Delta AF$, the coolant temperature fluctuation amount $\Delta T_w$, or the rotation speed fluctuation amount $\Delta N_e$ of the engine 12, the outside air temperature fluctuation amount $\Delta T_{out}$, the average fuel amount $Q_{ftnkav}$ in the fuel tank 51, the average rotation speed $N_{rfav}$ of the radiator fan 62, the average vehicle speed $V_{av}$, and the previously estimated tank fuel temperature (the previous $T_{ftnk}$), respectively, and deriving the tank fuel temperature $T_{ftnk}$ by applying the set input variables x[1] to x[10] to the tank fuel temperature mapping.

In the embodiment, the tank fuel temperature mapping is composed of a neural network, in which there are $\alpha$ intermediate layers (hidden layers), respective activation functions h1 to h$\alpha$ of the intermediate layers are hyperbolic tangent functions, and an activation function f of an output layer is a ReLU (a ramp function). The respective activation functions h1 to h$\alpha$ of the intermediate layers are not limited to the hyperbolic tangent functions, and may be sigmoid functions or the like. The activation function f of the output layer is not limited to ReLU, and may be, for example, an identity function. The value $\alpha$ is not limited to two or more, and may be one.

Equation (1) is a relational equation representing an example of the tank fuel temperature mapping. In the equation (1), each of variables i, j, . . . , p represents a node of each intermediate layer, that is, a first intermediate layer, a second intermediate layer, . . . , an $\alpha$th intermediate layer. An integration number 10 represents the number of nodes of an input layer (the number of input variables), and each of the integration numbers n1, . . . , n$\alpha$ represents the number of nodes of each of the first intermediate layer, . . . , the $\alpha$th intermediate layer. A variable x[i] represents the above-described input variables x[1] to x[10]. Each of coefficients w[1, j, i], w[2, k, j], . . . represents a coefficient for regulating an input value of each node of each intermediate layer, that is, the first intermediate layer, the second intermediate layer, . . . , and a coefficient w[out, 1, p] represents a coefficient for regulating the input value of the output layer. The coefficients w[1, j, 0], w[2, k, 0], . . . , w[out, 1, 0] are bias parameters, and a variable x[0] is defined as one.

$$T_{ftnk} = f\left(\sum_{p=0}^{n\alpha} w[out, 1, p] \cdot h\alpha\left(\ldots h2\left(\sum_{j=0}^{n1} w[2, k, j] \cdot h1\left(\sum_{i=0}^{10} w[1, j, i] \cdot x[i]\right)\right)\right)\right) \quad (1)$$

As such, the tank fuel temperature $T_{ftnk}$ can be estimated. As a result, it is not necessary to provide a fuel temperature sensor in the fuel tank 51, such that the number of components and the cost can be reduced. A method of generating the tank fuel temperature mapping will be described below.

Next, a process of estimating the alcohol concentration $C_{fal}$ a will be described using the alcohol concentration estimation routine in FIG. 3. This routine is repeatedly executed by the electronic control unit 70 except when the execution is prohibited by the characteristic variable setting routine in FIG. 5. When the execution is prohibited by the characteristic variable setting routine in FIG. 5, in the embodiment, a previously estimated value for the alcohol concentration $C_{fal}$ is maintained. In the alcohol concentration estimation routine in FIG. 3, the CPU 71 of the electronic control unit 70 first acquires the average intake-air temperature $T_{aav}$, the average air-fuel ratio $AF_{av}$, the average coolant temperature $T_{wav}$, the average oil temperature $T_{oilav}$, the average rotation speed $N_{eav}$, the average load factor $KL_{av}$, the average torque $T_{eav}$, or the average ignition timing $T_{iav}$ of the engine 12 (step S200).

In the embodiment, for each of the average intake-air temperature $T_{aav}$, the average air-fuel ratio $AF_{av}$, the average coolant temperature $T_{wav}$, the average oil temperature $T_{oilav}$, the average rotation speed $N_{eav}$, the average load factor $KL_{av}$, the average torque $T_{eav}$, or the average ignition timing $T_{iav}$ of the engine 12, a value calculated as the average value for a predetermined time period $\Delta t_2$ is acquired using a sequential value for the predetermined time period $\Delta t_2$ (a value at each time from before the predetermined time period $\Delta t_2$ to the present) of each of the intake-air temperature $T_a$, the air-fuel ratio AF, the coolant temperature $T_w$, the oil temperature $T_{oil}$, the rotation speed $N_e$, the load factor KL, the torque $T_e$, or the ignition timing $T_i$ of the engine 12. As the predetermined time period $\Delta t_2$, for example, about 80 seconds to 120 seconds is used.

Here, for the intake-air temperature $T_a$, a value detected by the air flow meter 23a is acquired. For the air-fuel ratio AF, a value detected by the air-fuel ratio sensor 35 is acquired. For the coolant temperature $T_w$, a value detected by the coolant temperature sensor 40 is acquired. For the oil temperature $T_{oil}$, a value detected by the oil temperature sensor 42 is acquired. For the rotation speed $N_e$, a value calculated based on the crank angle $\theta_{cr}$ which is detected by the crank position sensor 15, is acquired. For the load factor KL, a value calculated based on the intake-air amount $Q_a$ and the rotation speed $N_e$ of the engine 12 is acquired. For the torque $T_e$, a value calculated (estimated) based on the throttle opening degree TH, which is detected by the throttle position sensor 24a, is acquired. For the ignition timing $T_i$, the target ignition timing $T_i^*$ set by the ignition control is acquired.

Subsequently, the CPU 71 estimates the alcohol concentration $C_{fal}$ of the fuel using the average intake-air temperature $T_{aav}$, the average air-fuel ratio $AF_{av}$, the average coolant temperature $T_{wav}$, the average oil temperature $T_{oilav}$, the average rotation speed $N_{eav}$, the average load factor $KL_{av}$, the average torque $T_{eav}$, or the average ignition timing $T_{iav}$ of the engine 12, all of which are acquired in step S200, and an alcohol concentration mapping (step S210), and then ends this routine.

Here, the alcohol concentration mapping receives, as an input, input variables including the average intake-air temperature $T_{aav}$, the average air-fuel ratio $AF_{av}$, the average coolant temperature $T_{wav}$, the average oil temperature $T_{oilav}$, the average rotation speed $N_{eav}$, the average load factor $KL_{av}$, the average torque $T_{eav}$, or the average ignition timing $T_{iav}$ of the engine 12, and outputs the alcohol concentration $C_{fal}$ of the fuel. The alcohol concentration mapping is stored in the flash memory 74.

The process of step S210 is executed by setting, as input variables x[1] to x[8] of the alcohol concentration mapping, the average intake-air temperature $T_{aav}$, the average air-fuel ratio $AF_{av}$, the average coolant temperature $T_{wav}$, the average oil temperature $T_{oilav}$, the average rotation speed $N_{eav}$, the average load factor $KL_{av}$, the average torque $T_{eav}$, or the average ignition timing $T_{iav}$ of the engine 12, respectively, and deriving the alcohol concentration $C_{fal}$ of the fuel by applying the set input variables x[1] to x[8] to the alcohol concentration mapping. In the embodiment, the alcohol concentration mapping is composed of a neural network similar to the tank fuel temperature mapping. As such, the alcohol concentration $C_{fal}$ of the fuel can be estimated. As a result, it is not necessary to provide a sensor that detects the alcohol concentration $C_{fal}$ of the fuel, such that the number of components and the cost can be reduced. A method of generating the alcohol concentration mapping will be described below.

Next, a process of estimating the tank internal pressure $P_{tnk}$ will be described using the tank internal pressure estimation routine in FIG. 4. This routine is repeatedly executed by the electronic control unit 70. In the tank internal pressure estimation routine in FIG. 4, the CPU 71 of the electronic control unit 70 first acquires the fuel amount $Q_{ftnk}$ in the fuel tank 51 (step S300). Here, for the fuel amount $Q_{ftnk}$ in the fuel tank 51, a value detected by the fuel amount sensor 51a is acquired.

Subsequently, the CPU 71 estimates the tank internal pressure $P_{tnk}$ using the fuel amount $Q_{ftnk}$ in the fuel tank 51 acquired in step S300 and a tank internal pressure mapping (step S310), and then ends this routine. Here, the tank internal pressure mapping receives, as an input, an input variable including the fuel amount $Q_{ftnk}$ in the fuel tank 51, and outputs the tank internal pressure $P_{tnk}$. The tank internal pressure mapping is stored in the flash memory 74.

The process of step S310 is executed by setting the fuel amount $Q_{ftnk}$ in the fuel tank 51 as an input variable x[1] of the tank internal pressure mapping, and deriving the tank internal pressure $P_{tnk}$ by applying the set input variable x[1] to the tank internal pressure mapping. In the embodiment, the tank internal pressure mapping is composed of a neural network. As such, the tank internal pressure $P_{tnk}$ can be estimated. As a result, it is not necessary to provide the internal pressure sensor in the fuel tank 51, such that the number of components and the cost can be reduced. A method of generating the tank internal pressure mapping will be described below.

Next, a process of setting the characteristic variable $A_{lp}$ of the feed pump 52 will be described using the characteristic variable setting routine in FIG. 5. This routine is executed by the electronic control unit 70 at a time when the system is started after the fuel tank 51 is refueled. Whether the refueling is executed is determined, for example, by checking whether the amount of fuel $Q_{ftnk}$ in the fuel tank 51 is increased or checking a result of communication with a refueling stand. In the embodiment, the characteristic variable $A_{lp}$ is expressed as a relative value when a reference value is one. When the characteristic variable setting routine in FIG. 5 is executed, the electronic control unit 70 first prohibits the execution of the tank fuel temperature estimation routine in FIG. 2, the alcohol concentration estimation routine in FIG. 3, or the low-pressure fuel pressure estimation routine in FIG. 8 (step S400), and starts the execution of a relief pressure control (step S410).

Here, the relief pressure control is executed by controlling the feed pump 52 such that a value of the fuel pressure in the low-pressure supply pipe 53 becomes equal to or greater than the threshold value $P_{floref}$ and the relief valve 56 is opened. When, for example, the relief valve 56 is not provided, the relief pressure control is executed by setting the target discharge flow rate $Q_{flpo}^*$ or the target rotation speed $N_{lp}^*$ of the feed pump 52 in which the value of the fuel pressure in the low-pressure supply pipe 53 becomes greater than the threshold value $P_{floref}$ to some degree, setting the target duty $D_{lp}^*$ of the feed pump 52 based on the target discharge flow rate $Q_{flpo}^*$ or the target rotation speed $N_{lp}^*$, and controlling the feed pump 52 using the target duty $D_{lp}^*$.

At the time when the fuel tank 51 is refueled, the properties (the temperature and the alcohol concentration) of the refueled fuel may differ from those of the fuel before refueling. In the case where the properties of the refueled fuel differ from those of the fuel before refueling, when the fuel pressure in the low-pressure supply pipe 53 is adjusted within a range to some degree less than the threshold value $P_{floref}$, the fuel pressure in the low-pressure supply pipe 53 becomes unstable after refueling, and it may adversely influence the fuel injection control and the like. However, in the embodiment, by executing the relief pressure control, the fuel pressure in the low-pressure supply pipe 53 can be stabilized at the threshold value $P_{floref}$ even when the properties of the refueled fuel differ from those of the fuel before refueling, such that it is possible to restrain the adverse influence on the fuel injection control and the like.

Further, in the case where the properties of the refueled fuel differ from those of the fuel before refueling, even when fuels are mixed in the fuel tank 51, the fuel remains in the low-pressure supply pipe 53 and the like before refueling and the properties of the fuels may differ between the inside of the fuel tank 51 and the inside of the low-pressure supply pipe 53, and the like. At this time, when the tank fuel temperature $T_{ftnk}$, the alcohol concentration $C_{fal}$, or the low-pressure fuel pressure $P_{flo}$ is estimated, the accuracy of these estimations may not be high. Based on this, in the embodiment, the execution of the tank fuel temperature estimation routine in FIG. 2, the alcohol concentration estimation routine in FIG. 3, or the low-pressure fuel pressure estimation routine in FIG. 8 is prohibited. As a result, it is possible to avoid estimating the tank fuel temperature $T_{ftnk}$, the alcohol concentration $C_{fal}$, or the low-pressure fuel pressure $P_{flo}$ with low accuracy.

Then, the electronic control unit 70 acquires an integrated consumption flow rate value $Q_{fecsum}$ of the engine 12 (step S420). Here, for the integrated consumption flow rate value $Q_{fecsum}$ of the engine 12, a value calculated as the integrated value from the start of the execution of this routine for the consumption flow rate $Q_{fec}$ of the engine 12 is acquired. The consumption flow rate $Q_{fec}$ of the engine 12 is calculated as a sum of the consumption flow rates $Q_{fpc}$, $Q_{fdc}$ of the port injection valve 25 and the cylinder injection valve 26, based on the fuel injection amounts $Q_{fp}$, $Q_{fd}$ of the port injection valve 25 and the cylinder injection valve 26.

Further, the electronic control unit 70 determines whether the integrated consumption flow rate value $Q_{fecsum}$ of the engine 12 becomes equal to or greater than a threshold value $Q_{fecsumref}$ (step S430). Here, the threshold value $Q_{fecsumref}$ is used for determining whether all the fuel that remains in the low-pressure supply pipe 53 or the high-pressure supply pipe 58 before refueling has been injected from the port injection valve 25 or the cylinder injection valve 26, that is, whether the fuels before and after refueling have been sufficiently mixed in the fuel tank 51, the low-pressure supply pipe 53, or the high-pressure supply pipe 58. The threshold value $Q_{fecsumref}$ is determined based on a volume and the like of the low-pressure supply pipe 53 or the high-pressure supply pipe 58, in the embodiment, a condition in which the integrated consumption flow rate value $Q_{fecsum}$ of the engine 12 becomes equal to or greater than the threshold value $Q_{fecsumref}$ is used as a condition for releasing the relief pressure control.

When the integrated consumption flow rate value $Q_{fecsum}$ of the engine 12 is less than the threshold value $Q_{fecsumref}$, the electronic control unit 70 determines that the condition for releasing the relief pressure control is not satisfied, and the process returns to step S420. Then, the processes of steps S420 and S430 are repeatedly executed, and, in step S430, when the integrated consumption flow rate value $Q_{fecsum}$ of the engine 12 becomes equal to or greater than the threshold value $Q_{fecsumref}$, the electronic control unit 70 determines that the condition for releasing the relief pressure control is satisfied.

Then, the electronic control unit 70 permits the execution of the tank fuel temperature estimation routine in FIG. 2, the alcohol concentration estimation routine in FIG. 3, or the low-pressure fuel pressure estimation routine in FIG. 8 (step S440). Thereafter, the electronic control unit 70 acquires the rotation speed $N_{lp}$, the operation current $I_{lp}$, or the operation voltage $V_{lp}$ of the feed pump 52, and the tank fuel temperature $T_{ftnk}$ at the time when the condition for releasing the relief pressure control is satisfied (step S450). Here, for the rotation speed $N_{lp}$, the operation current $I_{lp}$, or the operation voltage $V_{lp}$ of the feed pump 52, all of which are the values at the time when the condition for releasing the relief pressure control is satisfied and the values detected by the state detection device 52a after the condition for releasing the relief pressure control is satisfied are acquired, respectively. For the tank fuel temperature $T_{ftnk}$ at the time when the condition for releasing the relief pressure control is satisfied, a value estimated by the tank fuel temperature estimation routine in FIG. 2 after the condition for releasing the relief pressure control is satisfied is acquired.

Further, the electronic control unit 70 sets the characteristic variable $A_{lp}$ of the feed pump 52 using the rotation speed $N_{lp}$, the operation current $I_{lp}$, or the operation voltage $V_{lp}$ of the feed pump 52, and the tank fuel temperature $T_{ftnk}$ at the time when the condition for releasing the relief pressure control is satisfied, all of which are the values acquired in step S450, and a characteristic variable mapping (step S460), and ends the execution of the relief pressure control (step S470), and then, ends this routine.

Here, the characteristic variable mapping receives, as an input, input variables including the rotation speed $N_{lp}$, the operation current $I_{lp}$, or the operation voltage $V_{lp}$ of the feed pump 52, and the tank fuel temperature $T_{ftnk}$ at the time when the condition for releasing the relief pressure control is satisfied, and outputs the characteristic variable $A_{lp}$ of the feed pump 52. The characteristic variable mapping is stored in the flash memory 74.

The process of step S460 is executed by setting, as input variables x[1] to x[4] of the characteristic variable mapping, the rotation speed $N_{lp}$, the operation current $I_{lp}$, or the operation voltage $V_{lp}$ of the feed pump 52, and the tank fuel temperature $T_{ftnk}$ at the time when the condition for releasing the relief pressure control is satisfied, respectively, and deriving the characteristic variable $A_{lp}$ of the feed pump 52 by applying the set input variables x[1] to x[4] to the characteristic variable mapping. In the embodiment, the characteristic variable mapping is determined as a map, an arithmetic expression, or the like through experiments, analysis, or the like by humans. As such, the characteristic variable $A_{lp}$ of the feed pump 52 can be set.

In the characteristic variable setting routine in FIG. 5, at the time when the system is started after the fuel tank 51 is refueled, it is possible to avoid estimating the tank fuel temperature $T_{ftnk}$, the alcohol concentration $C_{fal}$, or the low-pressure fuel pressure $P_{flo}$ with low accuracy by prohibiting the execution of the tank fuel temperature estimation routine in FIG. 2, the alcohol concentration estimation routine in FIG. 3, or the low-pressure fuel pressure estimation routine in FIG. 8 until the condition for releasing the relief pressure control is satisfied.

Next, a process of estimating the pressure loss $L_{lo}$ of the low-pressure supply pipe 53 will be described using the pressure loss estimation routine in FIG. 6. This routine is repeatedly executed by the electronic control unit 70. In the pressure loss estimation routine in FIG. 6, the CPU 71 of the electronic control unit 70 first acquires the consumption flow rate $Q_{fec}$ of the engine 12 (step S500). Here, for the consumption flow rate $Q_{fec}$ of the engine 12, the CPU 71 acquires a value calculated as a sum of the consumption flow rates $Q_{fpc}$, $Q_{fdc}$ of the port injection valve 25 and the cylinder injection valve 26, based on the fuel injection amounts $Q_{fp}$, $Q_{fd}$ of the port injection valve 25 and the cylinder injection valve 26.

Subsequently, the CPU 71 estimates the pressure loss $L_{lo}$ of the low-pressure supply pipe 53 using the consumption flow rate $Q_{fec}$ of the engine 12 acquired in step S500 and a pressure loss mapping (step S510), and then ends this routine. Here, the pressure loss mapping receives, as an input, an input variable including the consumption flow rate $Q_{fec}$ of the engine 12, and outputs the pressure loss $L_{lo}$ of the low-pressure supply pipe 53. The pressure loss mapping is stored in the flash memory 74.

The process of step S510 is executed by setting the consumption flow rate $Q_{fec}$ of the engine 12 as an input variable x[1] of the pressure loss mapping, and deriving the pressure loss $L_{lo}$ of the low-pressure supply pipe 53 by applying the set input variable x[1] to the pressure loss mapping. In the embodiment, the pressure loss mapping is determined as a map, an arithmetic expression, or the like through experiments, analysis, or the like by humans. As such, the pressure loss $L_{lo}$ of the low-pressure supply pipe 53 can be estimated.

Next, a process of estimating the high-pressure pump fuel temperature $T_{fhp}$ will be described using the high-pressure ump fuel temperature estimation routine in FIG. 7. This routine is repeatedly executed by the electronic control unit 70. In the high-pressure pump fuel temperature estimation routine in FIG. 7, the CPU 71 of the electronic control unit 70 first acquires the intake-air temperature $T_a$, the oil temperature $T_{oil}$, the rotation speed $N_e$, or the load factor KL of the engine 12, an intake flow rate $Q_{thpi}$ of the high-pressure pump 57 (a flow rate of fuel supplied from the low-pressure supply pipe 53 to the high-pressure pump 57), the vehicle speed V, and a previously estimated high-pressure pump fuel temperature (a previous $T_{fhp}$)(step S600).

Here, for the intake-air temperature $T_a$ of the engine 12, a value detected by the air flow meter 23a is acquired. For the oil temperature $T_{oil}$, a value detected by the oil temperature sensor 42 is acquired. For the rotation speed $N_e$, a value calculated based on the crank angle $\theta_{cr}$, which is detected by the crank position sensor 15, is acquired. For the load factor KL, a value calculated based on the intake-air amount $Q_a$ and the rotation speed $N_e$ of the engine 12 is acquired. For the intake flow rate $Q_{thpi}$ of the high-pressure pump 57, on the assumption that a value of the consumption flow rate $Q_{fdc}$ of the cylinder injection valve 26 is equal to a value of the intake flow rate $Q_{thpi}$ of the high-pressure pump 57, the consumption flow rate $Q_{fdc}$ of the cylinder injection valve 26, which is calculated based on the target injection amount $Q_{fp}^*$ of the cylinder injection valve 26, is acquired. For the vehicle speed V, a value detected by the vehicle speed sensor 82 is acquired.

Subsequently, the CPU 71 estimates the high-pressure pump fuel temperature $T_{fhp}$ using the intake-air temperature $T_a$, the oil temperature $T_{oil}$, the rotation speed $N_e$, or the load factor KL of the engine 12, the intake flow rate $Q_{thpi}$ of the high-pressure pump 57, the vehicle speed V, and the previously estimated high-pressure pump fuel temperature (the previous $T_{fhp}$), all of which are acquired in step S600, and a high-pressure pump fuel temperature mapping (step S610), and then ends this routine.

Here, the high-pressure pump fuel temperature mapping receives, as an input, input variables including the intake-air temperature $T_a$, the oil temperature $T_{oil}$, the rotation speed $N_e$, or the load factor KL of the engine 12, the intake flow rate $Q_{thpi}$ of the high-pressure pump 57, the vehicle speed V, and the previously estimated high-pressure pump fuel temperature (the previous $T_{fhp}$), and outputs the high-pressure pump fuel temperature $T_{fhp}$. The high-pressure pump fuel temperature mapping is stored in the flash memory 74.

The process of step S610 is executed by setting, as input variables x[1] to x[7] of the high-pressure pump fuel temperature mapping, the intake-air temperature $T_a$, the oil temperature $T_{oil}$, the rotation speed $N_e$, or the load factor KL of the engine 12, the intake flow rate $Q_{thpi}$ of the high-pressure pump 57, the vehicle speed V, and the previously estimated high-pressure pump fuel temperature (the previous $T_{fhp}$), respectively, and deriving the high-pressure pump fuel temperature $T_{fhp}$ by applying the set input variables x[1] to x[7] to the high-pressure pump fuel temperature mapping. In the embodiment, the high-pressure pump fuel temperature mapping is composed of a neural network similar to the tank fuel temperature mapping. As such, the high-pressure pump fuel temperature $T_{fhp}$ can be estimated. As a result, it is not necessary to provide a fuel temperature sensor in the high-pressure pump 57, such that the number of components and the cost can be reduced. A method of generating the high-pressure pump fuel temperature mapping will be described below.

Next, a process of estimating the low-pressure fuel pressure $P_{flo}$, its base value $P_{flobs}$, or its pulsating component $P_{flopl}$ will be described using the low-pressure fuel pressure estimation routine in FIG. 8. This routine is repeatedly executed by the electronic control unit 70 except when the execution is prohibited by the characteristic variable setting routine in FIG. 5. Since the relief pressure control is being executed when the execution is prohibited by the characteristic variable setting routine in FIG. 5, in the embodiment, the low-pressure fuel pressure $P_{flo}$ or its base value $P_{flobs}$ is estimated to be the threshold value $P_{floref}$ and the pulsating component $P_{flopl}$ is estimated to be a value of approximately zero.

In the low-pressure fuel pressure estimation routine in FIG. 8, the CPU 71 of the electronic control unit 70 first acquires the rotation speed $N_{lp}$, the operation current $I_{lp}$, the operation voltage $V_{lp}$, or the characteristic variable $A_{lp}$ of the feed pump 52, the consumption flow rate $Q_{fec}$ of the engine 12, the tank fuel temperature $T_{ftnk}$, the alcohol concentration $C_{fal}$ of the fuel, the tank internal pressure $P_{tnk}$, the pressure loss $L_{lo}$ of the low-pressure supply pipe 53, and the high-pressure pump fuel temperature $T_{fhp}$ (step S700).

Here, for each of the rotation speed $N_{lp}$, the operation current $I_{lp}$, or the operation voltage $V_{lp}$ of the feed pump 52, a value detected by the state detection device 52a is acquired. For the characteristic variable $A_{lp}$ of the feed pump 52, a value estimated by the characteristic variable setting routine in FIG. 5 is acquired. For the fuel amount $Q_{ftnk}$ in the fuel tank 51, a value detected by the fuel amount sensor 51a is acquired. For the consumption flow rate $Q_{fec}$ of the engine 12, a value calculated as the sum of the consumption flow rates $Q_{fpc}$, $Q_{fdc}$ of the port injection valve 25 and the cylinder injection valve 26, based on the fuel injection amounts $Q_{fp}$, $Q_{fd}$ of the port injection valve 25 and the cylinder injection valve 26, is acquired. For the tank fuel temperature $T_{ftnk}$, a value estimated by the tank fuel temperature estimation routine in FIG. 2 is acquired. For the alcohol concentration $C_{fal}$ of the fuel, a value estimated by the alcohol concentration estimation routine in FIG. 3 is acquired. For the tank internal pressure $P_{tnk}$, a value estimated by the tank internal pressure estimation routine in FIG. 4 is acquired. For the pressure loss $L_{lo}$ of the low-pressure supply pipe 53, a value estimated by the pressure loss estimation routine FIG. 6 is acquired. For the high-pressure pump fuel temperature $T_{fhp}$, a value estimated by the high-pressure pump fuel temperature estimation routine in FIG. 7 is acquired.

Subsequently, the CPU 71 acquires present and past cam angles $\theta_{ci}$, $\theta_{ci1}$, $\theta_{ci2}$, present and past rotation speeds $N_e$, $N_{e1}$, $N_{e2}$, or present and past load factors KL, $KL_1$, $KL_2$ of the engine 12, present and past discharge flow rates $Q_{fhpo}$, $Q_{fhpo1}$, $Q_{fhpo2}$ of the high-pressure pump 57, and present and past high-pressure fuel pressures $P_{fhi}$, $P_{fhi1}$, $P_{fhi2}$ (step S710).

Here, for the present and past cam angles $\theta_{ci}$, $\theta_{ci1}$, $\theta_{ci2}$, values detected by the cam position sensor 44 most recently, before a predetermined time period $\Delta t_3$, and before a predetermined time period $\Delta t_4$, are acquired, respectively. As the predetermined time period $\Delta t_3$, for example, about several milliseconds is used, and as the predetermined time period $\Delta t_4$, for example, a time period, which is twice the predetermined time period $\Delta t_3$, is used. For the present and past rotation speeds $N_e$, $N_{e1}$, $N_{e2}$, values calculated most recently, before the predetermined time period $\Delta t_3$, and before the predetermined time period $\Delta t_4$, based on the crank angle $\theta_{cr}$ sequentially detected by the crank position sensor 15, are acquired, respectively. For the present and past load factors KL, $KL_1$, $KL_2$, values calculated most recently, before the predetermined time period $\Delta t_3$, and before the predetermined time period $\Delta t_4$, based on the intake-air amount $Q_a$ sequentially detected by the air flow meter 23a and the sequentially calculated rotation speed $N_e$ are acquired, respectively. For the present and past discharge flow rates $Q_{fhpo}$, $Q_{fhpo1}$, $Q_{fhpo2}$ of the high-pressure pump 57, values calculated based on the above-described intake flow rate $Q_{fhpi}$ of the high-pressure pump 57 (see step S600), the rotation speed of the intake camshaft, which is based on a cam angle $\theta_{ci}$ detected by the cam position sensor 44, or the like, are acquired, respectively. For the present and past high-pressure fuel pressures $P_{fhi}$, $P_{fhi1}$, $P_{fhi2}$, values detected by the fuel pressure sensor 58p most recently, before the predetermined time period $\Delta t_3$, and before the predetermined time period $\Delta t_4$, are acquired, respectively.

Then, the CPU 71 acquires the rotation speed fluctuation amount $\Delta N_{lp}$, an operation current fluctuation amount $\Delta I_{lp}$, or an operation voltage fluctuation amount $\Delta V_{lp}$ of the feed pump 52, and a consumption flow rate fluctuation amount $\Delta Q_{fec}$ of the engine 12 (step S720). In the embodiment, for the rotation speed fluctuation amount $\Delta N_{lp}$, the operation current fluctuation amount $\Delta I_{lp}$, or the operation voltage fluctuation amount $\Delta V_{lp}$ of the feed pump 52, and the consumption flow rate fluctuation amount $\Delta Q_{fec}$ of the engine 12, values calculated as fluctuation amounts of a predetermined time period $\Delta t_5$ using a sequential value for the predetermined time period $\Delta t_5$ (a value at each time from before the predetermined time period $\Delta t_5$ to the present) of the rotation speed $N_{lp}$, the operation current $I_{lp}$, or the operation voltage $V_{lp}$ of the feed pump 52, and the consumption flow rate $Q_{fec}$ of the engine 12 are acquired, respectively. The method of acquiring the rotation speed $N_{lp}$, the operation current lip, or the operation voltage $V_{lp}$ of the feed pump 52, and the consumption flow rate $Q_{fec}$ of the engine 12 has been described above. As the predetermined time period $\Delta t_5$, for example, about 5 to 25 milliseconds is used.

Upon acquiring the various pieces of data in this manner, the CPU 71 estimates the base value $P_{flobs}$ of the low-pressure fuel pressure $P_{flo}$ using the rotation speed $N_{lp}$, the operation current $I_{lp}$, the operation voltage $V_{lp}$, or the characteristic variable $A_{lp}$ of the feed pump 52, the consumption flow rate $Q_{fec}$ of the engine 12, the tank fuel temperature $T_{ftnk}$, the alcohol concentration $C_{fal}$ of the fuel, the tank internal pressure $P_{tnk}$, the pressure loss $L_{lo}$ of the low-pressure supply pipe 53, and the high-pressure pump fuel temperature $T_{fhp}$, all of which are acquired in step S700, and a base value mapping (a second mapping)(step S730).

Here, the base value mapping (the second mapping) receives, as an input, input variables (second input variables) including the rotation speed $N_{lp}$, the operation current $I_{lp}$, the operation voltage $V_{lp}$, or the characteristic variable $A_{lp}$ of the feed pump 52, the consumption flow rate $Q_{fec}$ of the engine 12, the tank fuel temperature $T_{fhp}$, the alcohol concentration $C_{fal}$ of the fuel, the tank internal pressure $P_{tnk}$, the pressure loss $L_{lo}$ of the low-pressure supply pipe 53, and the high-pressure pump fuel temperature $T_{fhp}$, and outputs the base value $P_{flobs}$. The base value mapping is stored in the flash memory 74.

The process of step S730 is executed by setting, as input variables x[1] to x[10] of the base value mapping, the rotation speed $N_{lp}$, the operation current $I_{lp}$, the operation voltage $V_{lp}$, or the characteristic variable $A_{lp}$ of the feed pump 52, the consumption flow rate $Q_{fec}$ of the engine 12, the tank fuel temperature $T_{ftnk}$, the alcohol concentration $C_{fal}$ of the fuel, the tank internal pressure $P_{tnk}$, the pressure loss $L_{lo}$ of the low-pressure supply pipe 53, and the high-pressure pump fuel temperature $T_{fhp}$, respectively, and deriving the base value $P_{flobs}$ by applying the set input variables x[1] to x[10] to the base value mapping. In the embodiment, the base value mapping is composed of a neural network similar to the tank fuel temperature mapping. As such, the base value $P_{flobs}$ can be estimated. A method of generating the base value mapping will be described below.

Then, the CPU 71 estimates the pulsating component $P_{flopl}$ of the low-pressure fuel pressure $P_{flo}$ using the present and past cam angles $\theta_{ci}$, $\theta_{ci1}$, $\theta_{ci2}$, the present and past rotation speeds $N_e$, $N_{e1}$, $N_{e2}$, or the present and past load factors KL, $KL_1$, $KL_2$ of the engine 12, the present and past discharge flow rates $Q_{fhpo}$, $Q_{fhpo1}$, $Q_{fhpo2}$ of the high-pressure pump 57, and the present and past high-pressure fuel pressures $P_{fhi}$, $P_{fhi1}$, $P_{fhi2}$, all of which are acquired in step S710, and a pulsating mapping (a first mapping) (step S740). As described above, during the driving of the high-pressure pump 57, the fuel pressure (the pressures of the fuel) in the low-pressure supply pipe 53 or in the high-pressure supply pipe 58 is pulsated according to the rotation of the engine 12 (the rotation of the intake camshaft). The pulsating component $P_{flopl}$ is a value that reflects this pulsation.

Here, the pulsating mapping (the first mapping) receives, as an input, input variables (first input variables) including the present and past cam angles $\theta_{ci}$, $\theta_{ci1}$, $\theta_{ci2}$, the present and past rotation speeds $N_e$, $N_{e1}$, $N_{e2}$, or the present and past load factors KL, $KL_1$, $KL_2$ of the engine 12, the present and past discharge flow rates $Q_{fhpo}$, $Q_{fhpo1}$, $Q_{fhpo2}$ of the high-pressure pump 57, and the present and past high-pressure fuel pressures $P_{fhi}$, $P_{fhi1}$, $P_{fhi2}$, and outputs the pulsating component $P_{flopl}$. The pulsating mapping is stored in the flash memory 74.

The process of step S740 is executed by setting, as input variables x[1] to x[15] of the pulsating mapping, the present and past cam angles $\theta_{ci}$, $\theta_{ci1}$, $\theta_{ci2}$, the present and past rotation speeds $N_e$, $N_{e1}$, $N_{e2}$, or the present and past load factors KL, $KL_1$, $KL_2$ of the engine 12, the present and past discharge flow rates $Q_{fhpo}$, $Q_{fhpo1}$, $Q_{fhpo2}$ of the high-pressure pump 57, and the present and past high-pressure fuel pressures $P_{fhi}$, $P_{fhi1}$, $P_{fhi2}$, respectively, and deriving the pulsating component $P_{flopl}$ by applying the set input variables x[1] to x[15] to the pulsating mapping. In the embodiment, the pulsating mapping is composed of a neural network similar to the tank fuel temperature mapping. As such, the pulsating component $P_{flopl}$ can be estimated. A method of generating the pulsating mapping will be described below.

Further, the CPU 71 estimates the low-pressure fuel pressure $P_{flo}$ using the base value $P_{flobs}$, the pulsating component $P_{flopl}$, the rotation speed fluctuation amount $\Delta N_{lp}$, the operation current fluctuation amount $\Delta I_{lp}$, or the operation voltage fluctuation amount $\Delta V_{lp}$, of the feed pump 52, and the consumption flow rate fluctuation amount $\Delta Q_{fec}$ of the engine 12, all of which are acquired in step S720, and a low-pressure fuel pressure mapping (a third mapping)(step S750), and then ends this routine.

Here, the low-pressure fuel pressure mapping (the third mapping) receives, as an input, input variables (third input variables) including the base value $P_{flobs}$, the pulsating component $P_{flopl}$, the rotation speed fluctuation amount $\Delta N_{lp}$, the operation current fluctuation amount $\Delta I_{lp}$, or the operation voltage fluctuation amount $\Delta V_{lp}$ of the feed pump 52, and the consumption flow rate fluctuation amount $\Delta Q_{fec}$ of the engine 12, and outputs the low-pressure fuel pressure $P_{flo}$. The low-pressure fuel pressure mapping is stored in the flash memory 74.

The process of step S750 is executed by setting, as input variables x[1] to x[6] of the low-pressure fuel pressure mapping, the base value $P_{flobs}$, the pulsating component $P_{flopl}$, the rotation speed fluctuation amount $\Delta N_{lp}$, the operation current fluctuation amount $\Delta I_{lp}$, or the operation voltage fluctuation amount $\Delta V_{lp}$ of the feed pump 52, and the consumption flow rate fluctuation amount $\Delta Q_{fec}$ of the engine 12, respectively, and deriving the low-pressure fuel pressure $P_{flo}$ by applying the set input variables x[1] to x[6] to the low-pressure fuel pressure mapping. In the embodiment, the low-pressure fuel pressure mapping is composed of a neural network similar to the tank fuel temperature mapping. As such, the low-pressure fuel pressure $P_{flo}$ can be estimated. As a result, it is not necessary to provide a fuel pressure sensor in the low-pressure supply pipe 53, such that the number of components and the cost can be reduced. A method of generating the low-pressure fuel pressure mapping will be described below.

Figure 9:
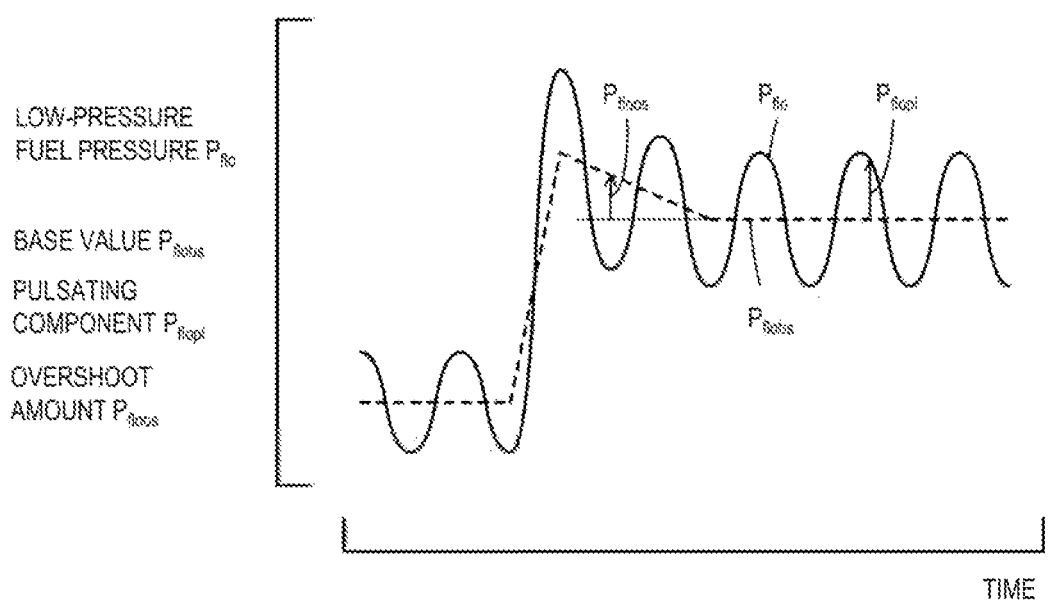
FIG. 9 is an explanatory diagram illustrating an example of a status of a low-pressure fuel pressure.

FIG. 9 is an explanatory diagram illustrating an example of a status of the low-pressure fuel pressure $P_{flo}$. As illustrated in FIG. 9, the low-pressure fuel pressure $P_{flo}$ is pulsated substantially around the base value $P_{flobs}$. Further, when the low-pressure fuel pressure $P_{flo}$ is increased, the base value $P_{flobs}$ of the low-pressure fuel pressure $P_{flo}$ is set to a value after the increase (a value after being stabilized) and overshoots. Through experiments, analysis, or the like, the inventors found that the overshoot amount $P_{floos}$ of the base value $P_{flobs}$ is based on the rotation speed fluctuation amount $\Delta N_{lp}$, the operation current fluctuation amount $\Delta I_{lp}$, or the operation voltage fluctuation amount $\Delta V_{lp}$ of the feed pump 52, and the consumption flow rate fluctuation amount $\Delta Q_{fec}$ of the engine 12. Based on this, in the embodiment, the low-pressure fuel pressure $P_{flo}$ is estimated based on the base value $P_{flobs}$, the pulsating component $P_{flopl}$, the rotation speed fluctuation amount $\Delta N_{lp}$, the operation current fluctuation amount $\Delta I_{lp}$, or the operation voltage fluctuation amount $\Delta V_{lp}$ of the feed pump 52, and the consumption flow rate fluctuation amount $\Delta Q_{fec}$ of the engine 12 (the overshoot amount $P_{floos}$ based on these). As such, the low-pressure fuel pressure $P_{flo}$ that reflects the base value $P_{flobs}$, the pulsating component $P_{flopl}$, and the overshoot amount $P_{floos}$ can be estimated. As a result, it is not necessary to provide a fuel pressure sensor in the low-pressure supply pipe 53, such that the number of components and the cost can be reduced.

Next, the method of generating each of the tank fuel temperature mapping, the alcohol concentration mapping, the tank internal pressure mapping, the high-pressure pump fuel temperature mapping, the base value mapping (the second mapping), the pulsating mapping (the first mapping), and the low-pressure fuel pressure mapping (the third mapping) will be described.

Figure 10:
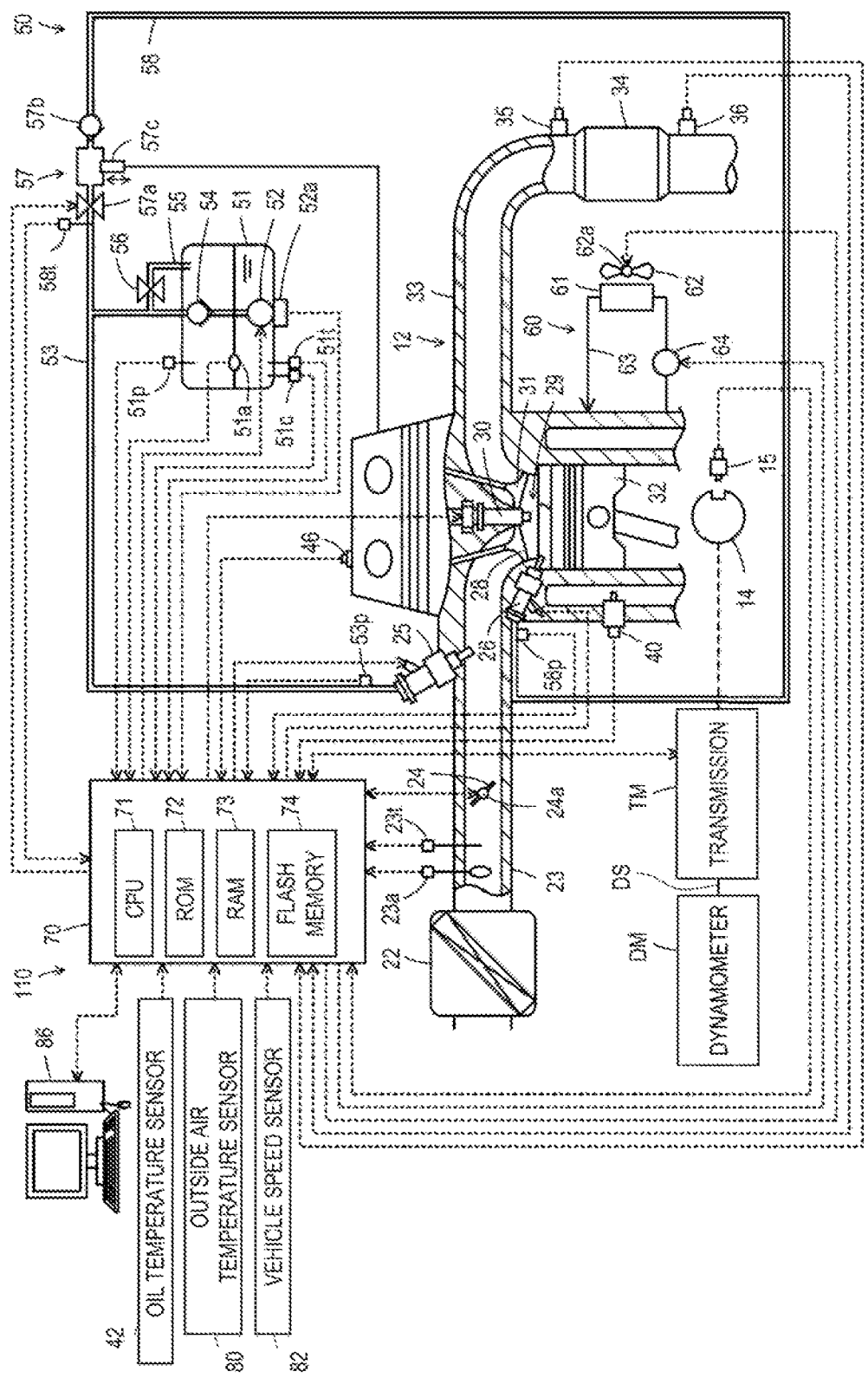
FIG. 10 is a block diagram illustrating a schematic configuration of a test device and an analysis device, which are used for generating each mapping by machine learning.

FIG. 10 is a block diagram illustrating a schematic configuration of a test device 110 and an analysis device 86 used for generating each mapping by machine learning. The hardware configuration of the test device 110 is the same as that of the vehicle 10 in FIG. 1 except that a dynamometer DM, instead of the differential gear DF and the drive wheel DW, is mounted on the drive shaft DS, and that a fuel temperature sensor 51*t*, an alcohol concentration sensor 51*c*, an internal pressure sensor 51*p*, a fuel pressure sensor 53*p*, and a fuel temperature sensor 58*t* are provided. In the test device 110, since the dynamometer DM, instead of the drive wheel DW, is mounted on the drive shaft DS, the vehicle speed sensor 82 estimates the vehicle speed V from the rotation speed of the drive shaft DS. Further, the test device 110 is housed in equipment, and tests can be executed under various test conditions (conditions on states of the engine 12, the fuel supply device 50, the cooling device 60, and the transmission TM, conditions on the outside air temperature and the intake-air temperature, conditions on the traveling wind, and the like). Similar to the vehicle 10, the test device 110 may be capable of traveling by having a differential gear DF or a drive wheel DW mounted on the drive shaft DS.

The fuel temperature sensor 51*t* is mounted on the fuel tank 51, and detects the tank fuel temperature as a detection tank fuel temperature $T_{ftnkdt}$, and sends it to the electronic control unit 70. The internal pressure sensor 51*p* is mounted on the fuel tank 51, and detects the tank internal pressure as a detection tank internal pressure $P_{tnkdt}$ and sends it to the electronic control unit 70. The fuel pressure sensor 53*p* is mounted in the vicinity of the port injection valve 25 of the low-pressure supply pipe 53 (for example, a low-pressure delivery pipe), and detects the low-pressure fuel pressure as a detection low-pressure fuel pressure $P_{flodt}$ and sends it to the electronic control unit 70. The fuel temperature sensor 58*t* is mounted on the low-pressure supply pipe 53 side (in the vicinity of the electromagnetic valve 57*a*) of the high-pressure pump 57, and detects the high-pressure pump fuel temperature as a detection high-pressure pump fuel temperature $T_{fhpdt}$ and sends it to the electronic control unit 70.

The analysis device 86 is composed of a general-purpose computer, and is provided with a CPU, a ROM, a RAM, a flash memory, a large-capacity storage device (for example, an HDD, an SSD, or the like), an input/output port, or a communication port. An input device and a display device are connected to the analysis device 86. Examples of the input device include a mouse or a keyboard. The analysis device 86 can communicate with the electronic control unit 70 of the test device 110.

Figure 11:
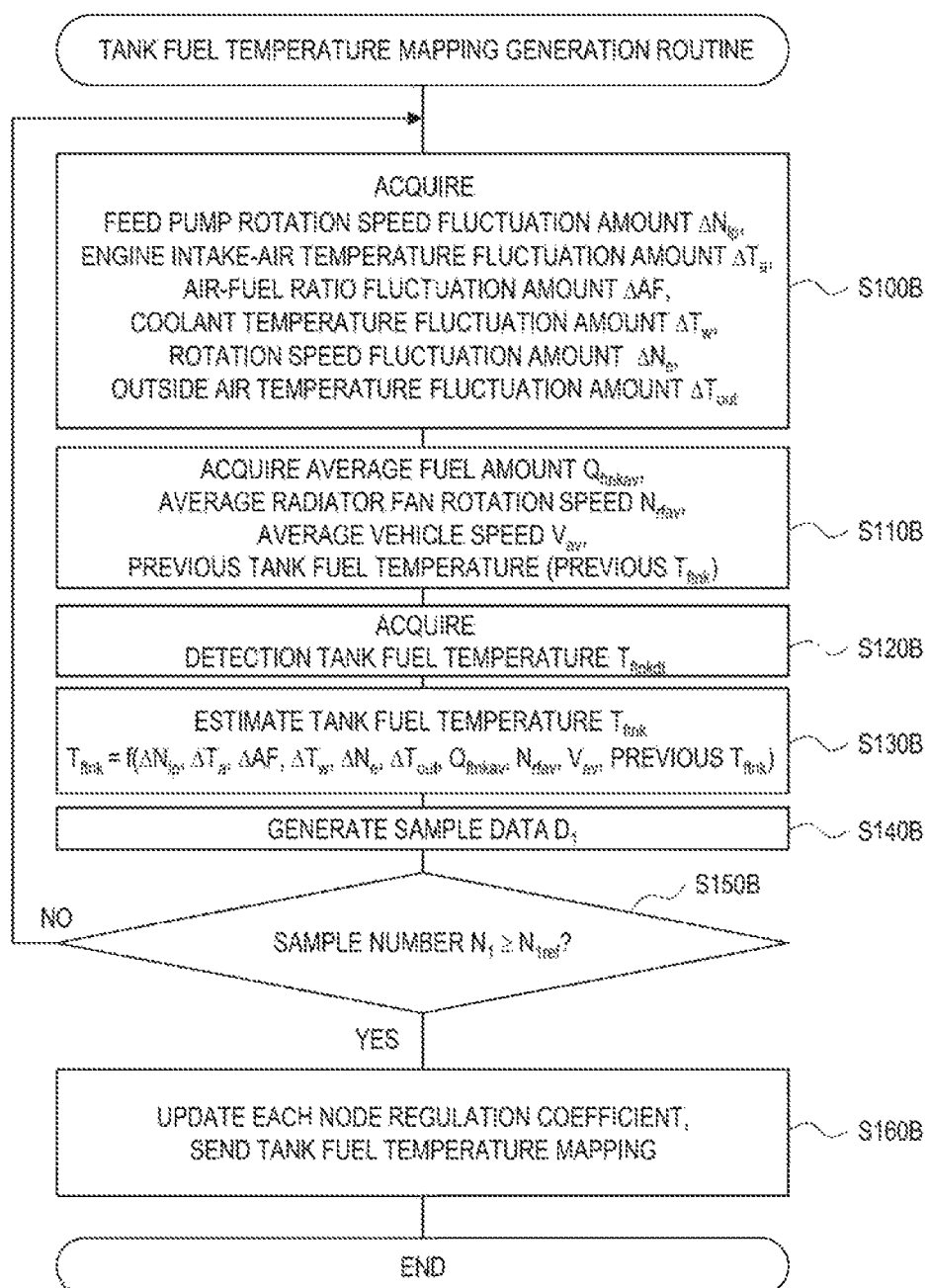
FIG. 11 is a flowchart illustrating an example of a tank fuel temperature mapping generation routine.
Figure 12:
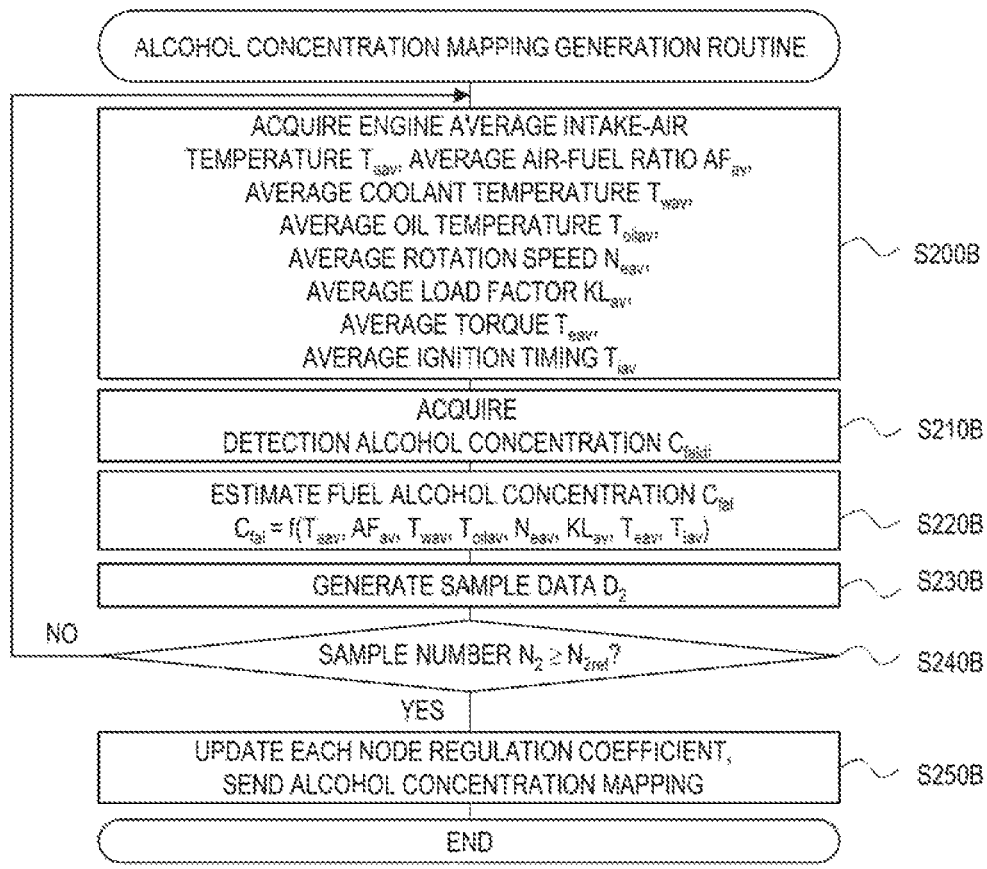
FIG. 12 is a flowchart illustrating an example of an alcohol concentration mapping generation routine.
Figure 13:
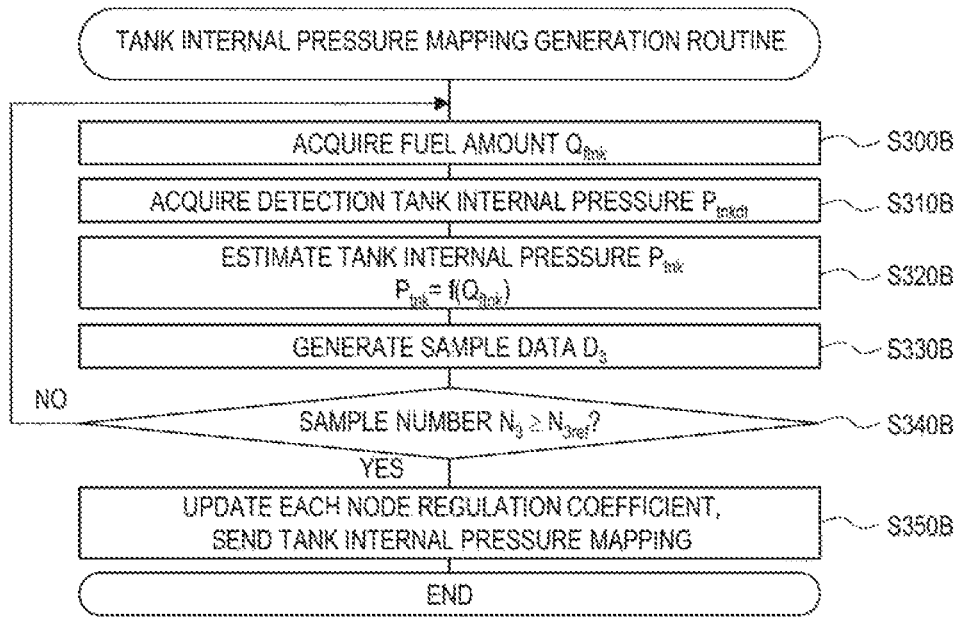
FIG. 13 is a flowchart illustrating an example of a tank internal pressure mapping generation routine.
Figure 14:
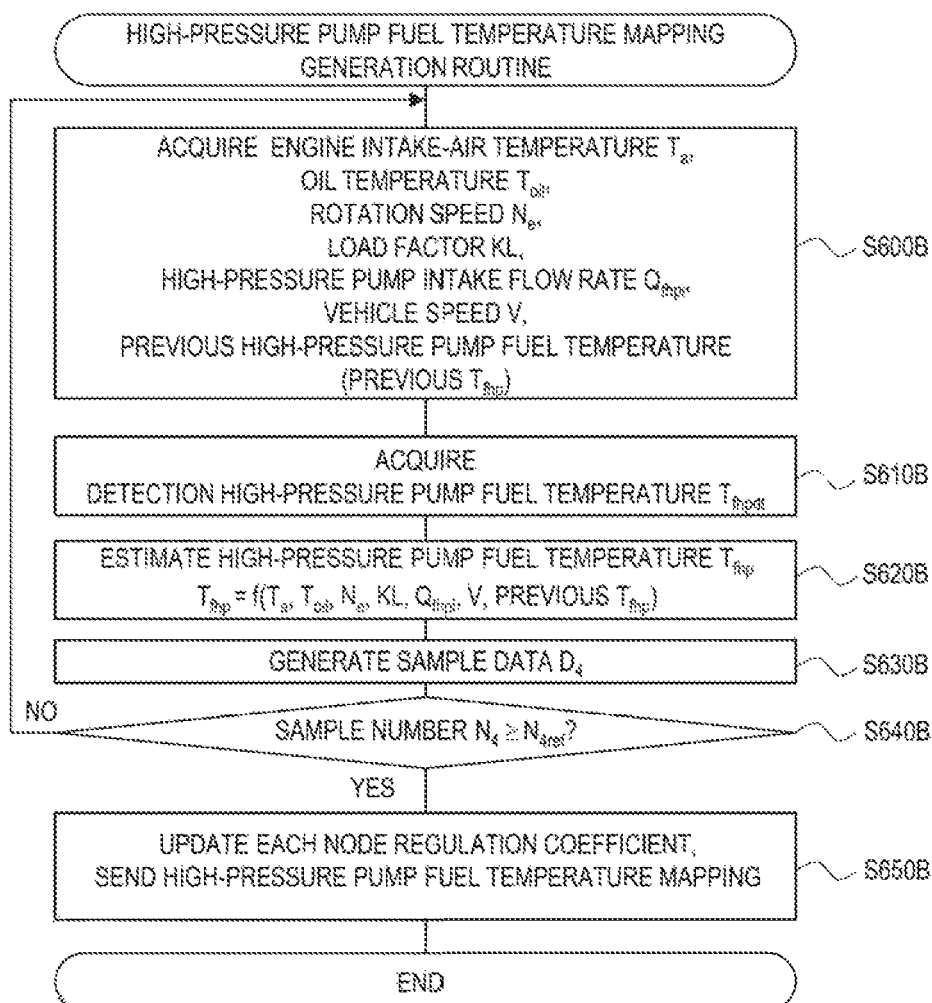
FIG. 14 is a flowchart illustrating an example of a high-pressure pump temperature mapping generation routine.

FIG. 11 is a flowchart illustrating an example of a tank fuel temperature mapping generation routine. FIG. 12 is a flowchart illustrating an example of an alcohol concentration mapping generation routine. FIG. 13 is a flowchart illustrating an example of a tank internal pressure mapping generation routine. FIG. 14 is a flowchart illustrating an example of a high-pressure pump fuel temperature mapping generation routine. FIG. is a flowchart illustrating an example of a generation routine of the base value mapping (the second mapping), the pulsating mapping (the first mapping), or the low-pressure fuel pressure mapping (the third mapping). These routines are executed when a CPU in the analysis device 86 reads the program stored in a ROM of the analysis device 86. Hereinafter, the above routines will be described in order.

The tank fuel temperature mapping generation routine in FIG. 11 will be described. Prior to this generation process, through experiments, analysis, or the like, the inventors found that the data acquired in steps S100 and S110 of the tank fuel temperature estimation routine in FIG. 2 has a relationship with the tank fuel temperature $T_{ftnk}$ (that is, the former influences the latter). Specifically, the inventors found that, for a heat quantity variable on a heat quantity of the fuel, a fluctuation amount per unit time influences the tank fuel temperature $T_{ftnk}$, and for a heat capacity variable on a heat capacity and heat transfer of the fuel, the average value per unit time influences the tank fuel temperature $T_{ftnk}$. Thus, the inventors found that the heat quantity variable includes the rotation speed $N_{fp}$ of the feed pump 52, the intake-air temperature $T_a$, the air-fuel ratio AF, the coolant temperature $T_w$, or the rotation speed $N_e$ of the engine 12, and the outside air temperature $T_{out}$, and the heat capacity variable includes the fuel amount $Q_{ftnk}$ in the fuel tank 51, the rotation speed $N_{rf}$ the radiator fan 62, and the vehicle speed V.

In the tank fuel temperature mapping generation routine in FIG. 11, the analysis device 86 first acquires, as training data, the same data as that acquired in the processes of steps S100 and S110 of the tank fuel temperature estimation routine in FIG. 2 (steps S100B and S110B), and acquires the detection tank fuel temperature $T_{ftnkdt}$ as teacher data from among the training data (step S120B). Here, for the detection tank fuel temperature $T_{ftnkdt}$, a value detected by the fuel temperature sensor 51t is acquired.

Subsequently, the analysis device 86 estimates, in the same manner as the process of step S120 of the tank fuel temperature estimation routine in FIG. 2, the tank fuel temperature $T_{ftnk}$ using the training data (the data acquired in steps S100B and 110B) other than the teacher data and the tank fuel temperature mapping composed of the neural network (step S130B). Then, the analysis device 86 generates sample data $D_1$ by associating the training data other than the teacher data and the estimated tank fuel temperature $T_{ftnk}$ with the detection tank fuel temperature $T_{ftnkdt}$ as the teacher data (step S140B).

Further, the analysis device 86 compares a number $N_1$ of the sample data $D_1$ with a threshold value $N_{1ref}$ (step S150B), and when the number $N_1$ of the sample data $D_1$ is less than the threshold value $N_{1ref}$, the process returns to step S100B. In the embodiment, the sample data $D_1$ is collected while changing the test conditions.

When the number $N_1$ of the sample data $D_1$ is equal to or greater than the threshold value $N_{1ref}$ in step S150B, the analysis device 86 updates a coefficient for regulating an input value of each node of the intermediate layer or the output layer in the tank fuel temperature mapping composed of the neural network (the above-described coefficientw[l, j, i] and the like, hereinafter referred to as a "node regulation coefficient"), sends the tank fuel temperature mapping including the updated each node regulation coefficient to the electronic control unit 70 (step S160B), and then ends this routine. This process is executed by, for example, updating the node regulation coefficient using an error backpropagation method such that the sum of squares of an error between the detection tank fuel temperature $T_{ftnkdt}$ as the teacher data and the tank fuel temperature $T_{ftnk}$ estimated in step S130B of each sample data $D_1$ becomes small. The electronic control unit 70 stores the tank fuel temperature mapping received from the analysis device 86 in the flash memory 74.

Next, the alcohol concentration mapping generation routine in FIG. 12 will be described. Prior to this generation process, through experiments, analysis, or the like, the inventors found that the data acquired in step S200 of the alcohol concentration estimation routine in FIG. 3 has a relationship with the alcohol concentration $C_{fal}$ (that is, the former influences the latter).

In the alcohol concentration mapping generation routine in FIG. 12, the analysis device 86 first acquires, as the training data, the same data as that acquired in the process of step S200 of the alcohol concentration estimation routine in FIG. 3 (step S200B) and acquires a detection alcohol concentration $C_{faldt}$ as the teacher data from among the training data (step S210B). Here, for the detection alcohol concentration $C_{faldt}$, a value detected by the alcohol concentration sensor 51c is acquired.

Subsequently, the analysis device 86 estimates, in the same manner as the process of step S210 of the alcohol concentration estimation routine in FIG. 3, the alcohol concentration $C_{fal}$ using the training data (the data acquired in step S200B) other than the teacher data and the alcohol concentration mapping composed of the neural network (step S220B). Then, the analysis device 86 generates sample data $D_2$ by associating the training data other than the teacher data and the estimated alcohol concentration $C_{fal}$ with the detection alcohol concentration $C_{faldt}$ as the teacher data (step S230B).

Further, the analysis device 86 compares a number $N_2$ of the sample data $D_2$ with a threshold value $N_{2ref}$ (step S240B), and when the number $N_2$ of the sample data $D_2$ is less than the threshold value $N_{2ref}$, the process returns to step S200B. In the embodiment, the sample data $D_2$ is collected while changing the test conditions.

When the number $N_2$ of the sample data $D_2$ is equal to or greater than the threshold value $N_{2ref}$ in step S240B, the analysis device 86 updates, in the same manner as the process of step S160B of the tank fuel temperature mapping generation process in FIG. 11, each node regulation coefficient of the alcohol concentration mapping composed of the neural network, sends the alcohol concentration mapping including the updated each node regulation coefficient to the electronic control unit 70 (step S250B), and then ends this routine. The electronic control unit 70 stores the alcohol concentration mapping received from the analysis device 86 in the flash memory 74.

Next, the tank internal pressure mapping generation routine in FIG. 13 will be described. Prior to this generation process, through experiments, analysis, or the like, the inventors found that the data acquired in step S300 of the tank internal pressure estimation routine in FIG. 4 has a relationship with the tank internal pressure $P_{tnk}$ (that is, the former influences the latter).

In the tank internal pressure mapping generation routine in FIG. 13, the analysis device 86 first acquires, as the training data, the same data as that acquired in the process of step S300 of the tank internal pressure estimation routine in FIG. 4, specifically, the fuel amount $Q_{ftnk}$ in the fuel tank 51 (step S300B) and acquires the detection tank internal pressure $P_{tnkdt}$ as the teacher data from among the training data (step S310B). Here, for the detection tank internal pressure $P_{tnkdt}$, a value detected by the internal pressure sensor 51p is acquired.

Subsequently, the analysis device 86 estimates, in the same manner as the process of step S310 of the tank internal pressure estimation routine in FIG. 4, the tank internal pressure $P_{tnk}$ using the training data (the fuel amount $Q_{ftnk}$) other than the teacher data and the tank internal pressure mapping composed of the neural network (step S320B). Then, the analysis device 86 generates sample data $D_3$ by associating the training data other than the teacher data and the estimated tank internal pressure $P_{tnk}$ with the detection tank internal pressure $P_{tnkdt}$ as the teacher data (step S330B).

Further, the analysis device 86 compares a number $N_3$ of the sample data $D_3$ with a threshold value $N_{3ref}$ (step S340B), and when the number $N_3$ of the sample data $D_3$ is less than the threshold value $N_{3ref}$, the process returns to step S300B. In the embodiment, the sample data $D_3$ is collected while changing the test conditions (the fuel amount $Q_{ftnk}$, the fuel tank 51).

When the number $N_3$ of the sample data $D_3$ is equal to or greater than the threshold value $N_{3ref}$ in step S340B, the analysis device 86 updates, in the same manner as the process of step S160B of the tank fuel temperature mapping generation process in FIG. 11, each node regulation coefficient of the tank internal pressure mapping composed of the neural network, sends the tank internal pressure mapping including the updated each node regulation coefficient to the electronic control unit 70 (step S350B), and then ends this routine. The electronic control unit 70 stores the tank internal pressure mapping received from the analysis device 86 in the flash memory 74.

Next, the high-pressure pump fuel temperature mapping generation routine in FIG. 14 will be described. Prior to this generation process, through experiments, analysis, or the like, the inventors found that the data acquired in step S600 of the high-pressure pump fuel temperature estimation routine in FIG. 7 has a relationship with the high-pressure pump fuel temperature $T_{fhp}$ (that is, the former influences the latter).

In the high-pressure pump fuel temperature mapping generation routine in FIG. 14, the analysis device 86 first acquires, as the training data, the same data as that acquired in the process of step S600 of the high-pressure pump fuel temperature estimation routine in FIG. 7 (step S600B) and acquires the detection high-pressure pump fuel temperature $T_{fhpdt}$ as the teacher data from among the training data (step S610B). Here, for the detection high-pressure pump fuel temperature $T_{fhpdt}$, a value detected by the fuel temperature sensor 58t is acquired.

Subsequently, the analysis device 86 estimates, in the same manner as the process of step S610 of the high-pressure pump fuel temperature estimation routine in FIG. 4, the high-pressure pump fuel temperature $T_{fhp}$ using the training data (the data acquired in step S600B) other than the teacher data and the high-pressure pump fuel temperature mapping composed of the neural network (step S620B). Then, the analysis device 86 generates sample data $D_4$ by associating the training data other than the teacher data and the estimated high-pressure pump fuel temperature $T_{fhp}$ with the detection high-pressure pump fuel temperature $T_{fhpdt}$ as the teacher data (step S630B).

Further, the analysis device 86 compares a number $N_4$ of the sample data $D_4$ with a threshold value $N_{4ref}$ (step S640B), and when the number $N_4$ of the sample data $D_4$ is less than the threshold value $N_{4ref}$, the process returns to step S600B. In the embodiment, the sample data $D_4$ is collected while changing the test conditions.

When the number $N_4$ of the sample data $D_4$ is equal to or greater than the threshold value $N_{4ref}$ in step S640B, the analysis device 86 updates, in the same manner as the process of step S1608 of the tank fuel temperature mapping generation process in FIG. 11, each node regulation coefficient of the high-pressure pump fuel temperature mapping composed of the neural network, sends the high-pressure pump fuel temperature mapping including the updated each node regulation coefficient to the electronic control unit 70 (step S250B), and then ends this routine. The electronic control unit 70 stores the high-pressure pump fuel temperature mapping received from the analysis device 86 in the flash memory 74.

Next, the generation routine of the base value mapping (the second mapping), the pulsating mapping (the first mapping), or the low-pressure fuel pressure mapping (the third mapping) in FIG. 15 will be described. Prior to this generation process, through experiments, analysis, or the like, the inventors found that the data acquired in step S700 of the low-pressure fuel pressure estimation routine in FIG. 8 has a relationship with the base value $P_{flobs}$ (that is, the former influences the latter). Further, the inventors also found that the data acquired in step S710 has a relationship with the pulsating component $P_{flopl}$. Further, the inventors also found that the base value $P_{flobs}$, the pulsating component $P_{flopl}$, and the data acquired in step S720 have a relationship with the low-pressure fuel pressure $P_{flo}$.

Figure 15:
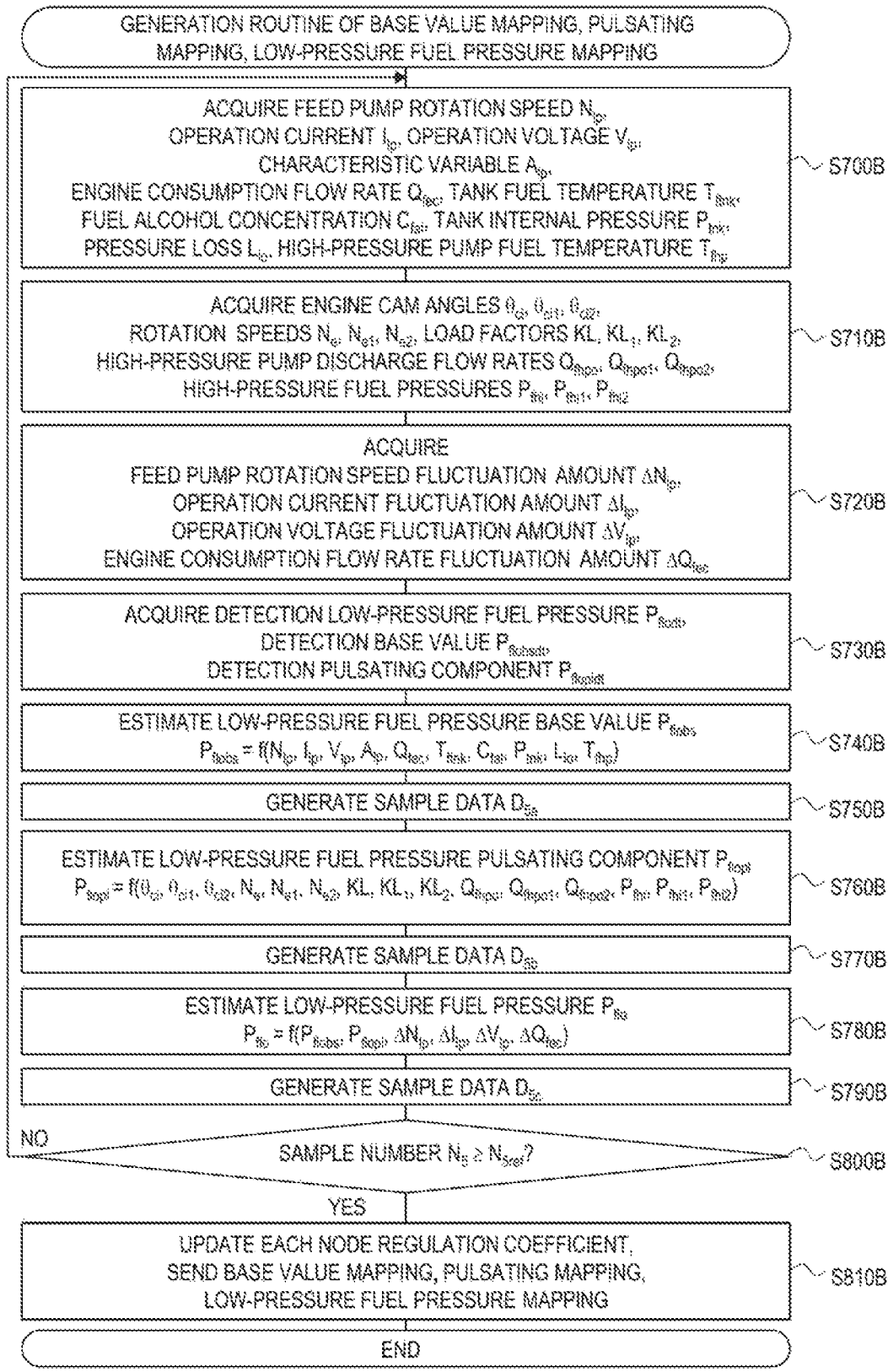
FIG. 15 is a flowchart illustrating an example of a generation routine of a base value mapping (a second mapping), a pulsating mapping (a first mapping), or a low-pressure fuel pressure mapping (a third mapping)

In the generation routine of the base value mapping, the pulsating mapping, or the low-pressure fuel pressure mapping in FIG. 15, the analysis device 86 first executes the same processes as those of steps S700 to S720 of the low-pressure fuel pressure estimation routine in FIG. 8 (steps S700B to S720B). Subsequently, the analysis device 86 acquires the detection low-pressure fuel pressure $P_{flodt}$, the detection base value $P_{flobsdt}$, or the detection pulsating component $P_{flopldt}$ (step S730B). Here, for the detection low-pressure fuel pressure $P_{flodt}$, a value detected by the fuel pressure sensor 53p is acquired. For the detection base value $P_{flobsdt}$, a value obtained by executing a slow change process (a smoothing process or a rate process) on the detection low-pressure fuel pressure $P_{flodt}$ is acquired. For the detection pulsating component $P_{flopldt}$, a value obtained by subtracting the detection base value $P_{flobsdt}$ from the detection low-pressure fuel pressure $P_{flodt}$ is acquired.

Then, the data acquired in step S700B is used as the training data for the base value mapping, and the detection base value $P_{flobsdt}$ acquired in step S730B is used as the teacher data from among the training data for the base value mapping. Then, the analysis device 86 estimates, in the same manner as the process of step S730 of the low-pressure fuel pressure estimation routine in FIG. 8, the base value $P_{flobs}$ using the training data other than the teacher data for the base value mapping and the base value mapping composed of the neural network (step S740B). Then, the analysis device 86 generates sample data $D_{5a}$ by associating the training data other than the teacher data for the base value mapping and the estimated base value $P_{flobs}$ with the detection base value $P_{flobsdt}$ as the teacher data for the base value mapping (step S750B).

Further, the data acquired in step S710B is used as the training data for the pulsating mapping, and the detection pulsating component $P_{flopldt}$ acquired in step S730B is used as the teacher data from among the training data for the pulsating mapping. Then, the analysis device 86 estimates, in the same manner as the process of step S740 of the low-pressure fuel pressure estimation routine in FIG. 8, the pulsating component $P_{flopl}$ using the training data other than the teacher data for the pulsating mapping and the pulsating mapping composed of the neural network (step S760B).

Then, the analysis device 86 generates sample data $D_{5b}$ by associating the training data other than the teacher data for the pulsating mapping and the estimated pulsating component $P_{flopl}$ with the detection pulsating component $P_{flopldt}$ as the teacher data for the pulsating mapping (step S770B).

In addition, the base value $P_{flobs}$ estimated in step S740B, the pulsating component $P_{flopl}$ estimated in step S760B, and the data acquired in step S720B are used as the training data for the low-pressure fuel pressure mapping, and the detection low-pressure fuel pressure $P_{flodt}$ acquired in step S730B is used as the teacher data from among the training data for the low-pressure fuel pressure mapping. Then, the analysis device 86 estimates, in the same manner as the process of step S750 of the low-pressure fuel pressure estimation routine in FIG. 8, the low-pressure fuel pressure $P_{flo}$ using the training data other than the teacher data for the low-pressure fuel pressure mapping and the low-pressure fuel pressure mapping composed of the neural network (step S780B). Then, the analysis device 86 generates sample data $D_{5c}$ by associating the training data other than the teacher data for the low-pressure fuel pressure mapping and the estimated low-pressure fuel pressure $P_{flo}$ with the detection low-pressure fuel pressure $P_{flodt}$ as the teacher data for the low-pressure fuel pressure mapping (step S790B). The low-pressure fuel pressure $P_{flo}$ may be estimated using the detection base value $P_{flobsdt}$ and the detection pulsating component $P_{flopldt}$ as the training data instead of the base value $P_{flobs}$ estimated in step S740B and the pulsating component $P_{flopl}$ estimated in step S760B.

Subsequently, the analysis device 86 compares a number $N_5$ of the sample data $D_{5a}$, $D_{5b}$, $D_{5c}$ with a threshold value $N_{5ref}$ (step S800B), and when the number $N_5$ of the sample data $D_{5a}$, $D_{5b}$, $D_{5c}$ is less than the threshold value $N_{5ref}$, the process returns to step S700B. In the embodiment, the sample data $D_{5a}$, $D_{5b}$, $D_{5c}$ is collected while changing the test conditions.

When the number $N_5$ of the sample data $D_{5a}$, $D_{5b}$, $D_{5c}$ is equal to or greater than the threshold value $N_{5ref}$ in step S800B, the analysis device 86 updates, in the same manner as the process of step S160B of the tank fuel temperature mapping generation process in FIG. 11, each node regulation coefficient of the base value mapping, the pulsating mapping, or the low-pressure fuel pressure mapping composed of the neural network, sends the base value mapping, the pulsating mapping, or the low-pressure fuel pressure mapping, each of which includes the updated each node regulation coefficient to the electronic control unit 70 (step S810B), and then ends this routine. The electronic control unit 70 stores the base value mapping, the pulsating mapping, or the low-pressure fuel pressure mapping, each of which is received from the analysis device 86, in the flash memory 74.

In the vehicle 10 of the above-described embodiment, as the fuel pressure estimation system, the electronic control unit 70 estimates the pulsating component $P_{flopl}$ of the low-pressure fuel pressure $P_{flo}$ using the present and past cam angles $\theta_{ci}$, $\theta_{ci1}$, $\theta_{ci2}$, the present and past rotation speeds $N_e$, $N_{e1}$, $N_{e2}$, or the present and past load factors $KL$, $KL_1$, $KL_2$ of the engine 12, the present and past discharge flow rates $Q_{fhpo}$, $Q_{fhpo1}$, $Q_{fhpo2}$ of the high-pressure pump 57, the present and past high-pressure fuel pressures $P_{fhi}$, $P_{fhi1}$, $P_{fhi2}$, and the pulsating mapping (the first mapping). As such, the pulsating component $P_{flopl}$ can be estimated. As a result, it is not necessary to provide the fuel pressure sensor 53p in the low-pressure supply pipe 53 (see FIG. 10), such that the number of components and the cost can be reduced.

Further, in the vehicle 10, the electronic control unit 70 estimates the base value $P_{flobs}$ using the rotation speed $N_{lp}$, the operation current lip, the operation voltage $V_{lp}$, or the characteristic variable $A_{lp}$ of the feed pump 52, the consumption flow rate $Q_{fec}$ of the engine 12, the tank fuel temperature $T_{ftnk}$, the alcohol concentration $C_{fal}$ of the fuel, the tank internal pressure $P_{tnk}$, and the pressure loss $L_{lo}$ of the low-pressure supply pipe 53, the high-pressure pump temperature $T_{fhp}$, and the base value mapping (the second mapping). Then, the electronic control unit 70 estimates the low-pressure fuel pressure $P_{flo}$ using the base value $P_{flobs}$, the pulsating component $P_{flopl}$, the rotation speed fluctuation amount $\Delta N_{lp}$, the operation current fluctuation amount $\Delta I_{lp}$, or the operation voltage fluctuation amount $\Delta V_{lp}$ of the feed pump 52, and the consumption flow rate fluctuation amount $\Delta Q_{fec}$ of the engine 12, and the low-pressure fuel pressure mapping (the third mapping). As such, the low-pressure fuel pressure $P_{flo}$ that reflects the base value $P_{flobs}$, the pulsating component $P_{flopl}$, and the overshoot amount $P_{floos}$ can be estimated. As a result, it is not necessary to provide a fuel pressure sensor 53p in the low-pressure supply pipe 53 (see FIG. 10), such that the number of components and the cost can be reduced.

Further, the electronic control unit 70 estimates the tank fuel temperature $T_{ftnk}$ using the rotation speed fluctuation amount $\Delta N_{lp}$, of the feed pump 52, the intake-air temperature fluctuation amount $\Delta T_a$, the air-fuel ratio fluctuation amount $\Delta AF$, the coolant temperature fluctuation amount $\Delta T_w$, or the rotation speed fluctuation amount $\Delta N_e$ of the engine 12, the outside air temperature fluctuation amount $\Delta T_{out}$, the average fuel amount $Q_{ftnkav}$ in the fuel tank 51, the average rotation speed $N_{rfav}$ of the radiator fan 62, the average vehicle speed $V_{av}$, the previously estimated tank fuel temperature (the previous $T_{ftnk}$), and the tank fuel temperature mapping. As such, the tank fuel temperature $T_{ftnk}$ can be estimated. As a result, it is not necessary to provide the fuel temperature sensor 51t in the fuel tank 51 (see FIG. 10), such that the number of components and the cost can be reduced.

Further, the electronic control unit 70 of the vehicle 10 estimates the alcohol concentration $C_{fal}$ of the fuel using the average intake-air temperature $T_{aav}$, the average air-fuel ratio $AF_{av}$, the average coolant temperature $T_{wav}$, the average oil temperature $T_{oilav}$, the average rotation speed $N_{env}$, the average load factor $KL_{av}$, the average torque $T_{eav}$, or the average ignition timing $T_{iav}$ of the engine 12, and the alcohol concentration mapping. As such, the alcohol concentration $C_{fal}$ can be estimated. As a result, it is not necessary to provide the alcohol concentration sensor 51c in the fuel tank 51 (see FIG. 10), such that the number of components and the cost can be reduced.

In addition, the electronic control unit 70 of the vehicle 10 estimates the tank internal pressure $P_{tnk}$ using the fuel amount $Q_{tnk}$ in the fuel tank 51 and the tank internal pressure mapping. As such, the tank internal pressure $P_{tnk}$ can be estimated. As a result, it is not necessary to provide the internal pressure sensor 51p in the fuel tank 51 (see FIG. 10), such that the number of components and the cost can be reduced.

The electronic control unit 70 sets the characteristic variable $A_{lp}$ of the feed pump 52 using the rotation speed $N_{lp}$, the operation current $I_{lp}$, or the operation voltage $V_{lp}$ of the feed pump 52, and the tank fuel temperature $T_{ftnk}$ at the time when the condition for releasing the relief pressure control is satisfied, and the characteristic variable mapping. As such, the characteristic variable $A_{lp}$ of the feed pump 52 can be estimated.

The electronic control unit 70 estimates the pressure loss $L_{lo}$ of the low-pressure supply pipe 53 using the consumption flow rate $Q_{fec}$ of the engine 12 and the pressure loss mapping. As such, the pressure loss $L_{lo}$ of the low-pressure supply pipe 53 can be estimated.

The electronic control unit 70 estimates the high-pressure pump fuel temperature $T_{fhp}$ using the intake-air temperature $T_a$, the oil temperature $T_{oil}$, the rotation speed $N_e$, or the load factor KL of the engine 12, the intake flow rate $Q_{fhpi}$ of the high-pressure pump 57, the vehicle speed V, the previously estimated high-pressure pump fuel temperature (the previous $T_{fhp}$), and the high-pressure pump fuel temperature mapping. As such, the high-pressure pump fuel temperature $T_{fhp}$ can be estimated. As a result, it is not necessary to provide the fuel temperature sensor 58t in the high-pressure pump 57 (see FIG. 10), such that the number of components and the cost can be reduced.

In the vehicle 10 of the embodiment, the variables input to the tank fuel temperature mapping used for the tank fuel temperature mapping estimation routine in FIG. 2 include the data acquired in steps S100 and S110. Here, the data acquired in step S100 specifically includes the rotation speed fluctuation amount $\Delta N_{lp}$ of the feed pump 52, the intake-air temperature fluctuation amount $\Delta T_a$, the air-fuel ratio fluctuation amount $\Delta AF$, the coolant temperature fluctuation amount $\Delta T_w$, or the rotation speed fluctuation amount $\Delta N_e$ of the engine 12, and the outside air temperature fluctuation amount $\Delta T_{out}$. The data acquired in step S110 specifically includes the average fuel amount $Q_{ftnkav}$ in the fuel tank 51, the average rotation speed $N_{rfav}$ of the radiator fan 62, the average vehicle speed $V_{av}$, and the previously estimated tank fuel temperature (the previous $T_{ftnk}$).

However, the variables input to the tank fuel temperature mapping may include, as values associated with the rotation speed fluctuation amount $\Delta N_{lp}$ of the feed pump 52, a fluctuation amount $\Delta Q$ for the predetermined time period $\Delta t_1$ of any one of the target discharge flow rate $Q_{fpo}*$, the target rotation speed $N_{lp}*$, and the target duty $D_{lp}*$, which are used for controlling the feed pump 52. Alternatively, in addition to the rotation speed fluctuation amount $\Delta N_{lp}$ of the feed pump 52 or a value associated with the rotation speed fluctuation amount $\Delta N_{lp}$, the variables input to the tank fuel temperature mapping may include at least a part of the operation current fluctuation amount $\Delta I_{lp}$ and the operation voltage fluctuation amount $\Delta V_{lp}$ of the feed pump 52.

Alternatively, the variables input to the tank fuel temperature mapping may include only a part of the intake-air temperature fluctuation amount $\Delta T_a$, the air-fuel ratio fluctuation amount $\Delta AF$, the coolant temperature fluctuation amount $\Delta T_w$, and the rotation speed fluctuation amount $\Delta N_e$ of the engine 12. Alternatively, in addition to at least a part of these, the variables input to the tank fuel temperature mapping may include the fluctuation amount for the predetermined time period $\Delta t_1$ of at least a part of the intake-air amount $Q_a$, the oil temperature $T_{oil}$, the load factor $KL_a$ the torque $T_e$, and the ignition timing $T_i$ of the engine 12, and the target injection amounts $Q_{fp}*$, $Q_{fd}*$ and the fuel injection amounts $Q_{fp}$, $Q_{fd}$ of the port injection valve 25 and the cylinder injection valve 26.

Further, the variables input to the tank fuel temperature mapping may include at least only a part of the average fuel amount $Q_{ftnkav}$ in the fuel tank 51, the average rotation speed $N_{rfav}$ of the radiator fan 62, and the average vehicle speed $V_{av}$, or the variables may include none of these. Alternatively, instead of the average fuel amount $Q_{ftnkav}$ in the fuel tank 51, the variables may include the fuel amount $Q_{ftnk}$. Instead of the average rotation speed $N_{rfav}$ of the radiator fan 62, the variables may include any one of the rotation speed $N_{rf}$ of the radiator fan 62, the average value for the predetermined time period $\Delta t_1$ of the target rotation speed $N_{r1}*$ used for controlling the radiator fan 62, and the target rotation speed $N_{r1}*$. Instead of the average vehicle speed $V_{av}$, the variables may include the vehicle speed V.

Figure 16:
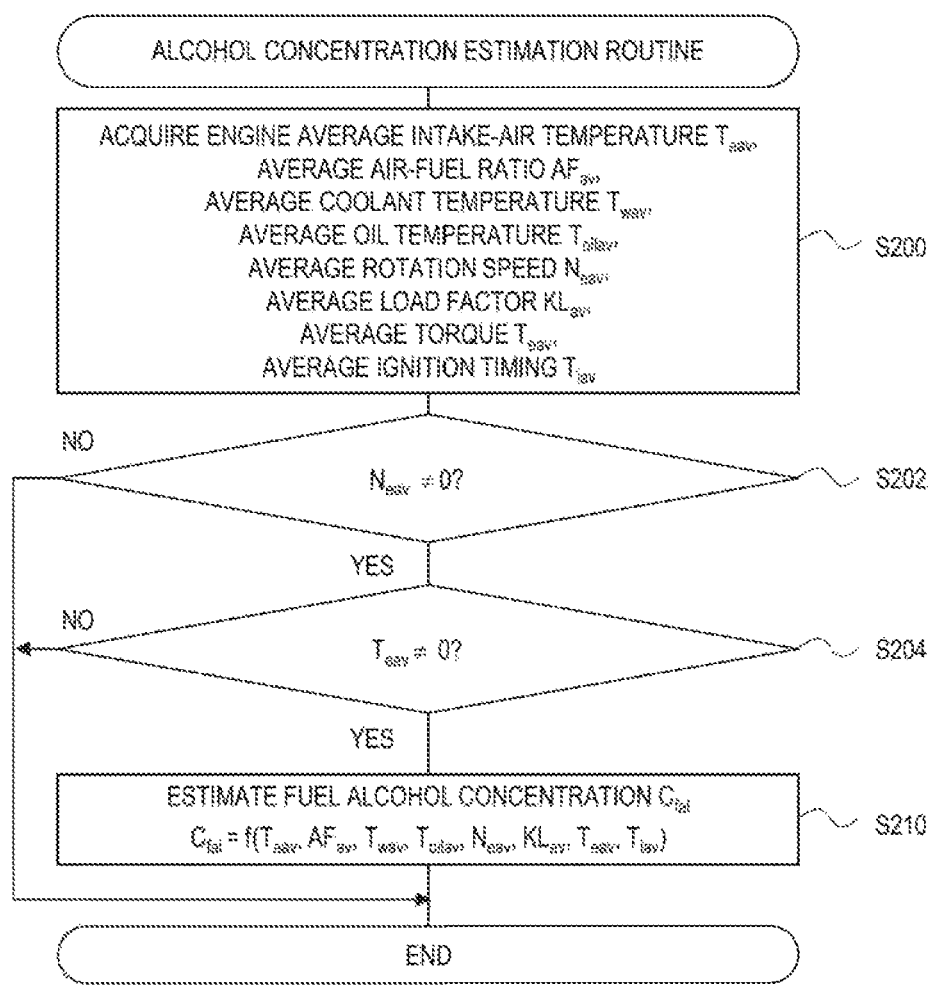
FIG. 16 is a flowchart illustrating another example of the alcohol concentration estimation routine.

In the vehicle 10 of the embodiment, the electronic control unit 70 estimates the alcohol concentration $C_{fal}$ using the alcohol concentration estimation routine in FIG. 3. However, instead of this, the electronic control unit 70 may estimate the alcohol concentration $C_{fal}$ using the alcohol concentration estimation routine in FIG. 16. The routine in FIG. 16 is the same as the routine in FIG. 3 except that the processes of steps S202 and S204 are added. Therefore, in the routine in FIG. 16, the same processes as those in the routine in FIG. 3 are denoted by the same step numbers and detailed description thereof will be omitted.

In the alcohol concentration estimation routine in FIG. 16, when data is input in step S200, the electronic control unit 70 determines whether a value of the average rotation speed $N_{eav}$ and a value of the average torque $T_{eav}$ of the engine 12 are zero, respectively (steps S202 and S204). Then, when neither the value of the average rotation speed $N_{eav}$ nor the value of the average torque $T_{eav}$ of the engine 12 is zero, the electronic control unit 70 estimates the alcohol concentration $C_{fal}$ of the fuel using the alcohol concentration mapping (step S210), and then ends this routine.

When the value of the average rotation speed $N_{eav}$ of the engine 12 in step S202 or the value of the average torque $T_{eav}$ of the engine 12 in step S204 is zero, this routine is ended without estimating the alcohol concentration $C_{fal}$. In a case where the alcohol concentration mapping is composed of the neural network when the value of the average rotation speed $N_{eav}$ or the value of the average torque $T_{eav}$ of the engine 12 is zero, that is, a part of the values input to the alcohol concentration mapping is zero, the alcohol concentration $C_{fal}$ may not be estimated properly. Therefore, in the modified example, when the value of the average rotation speed $N_{eav}$ or the value of the average torque $T_{eav}$ of the engine 12 is zero, the electronic control unit 70 does not estimate the alcohol concentration $C_{fal}$. As a result, it is possible to avoid estimating the alcohol concentration $C_{fal}$ with low accuracy.

In the alcohol concentration estimation routine in FIG. 16, when the value of the average rotation speed $N_{eav}$ or the value of the average torque $T_{eav}$ of the engine 12 is zero, the electronic control unit 70 does not estimate the alcohol concentration $C_{fal}$. However, when both the value of the average rotation speed $N_{eav}$ and the value of the average torque $T_{eav}$ of the engine 12 are zero, the electronic control unit 70 does not have to estimate the alcohol concentration $C_{fal}$.

In the vehicle 10 of the embodiment, the variables input to the alcohol concentration mapping used for the alcohol concentration estimation routine in FIG. 3 or 16 include the data acquired in step S200. Here, the data acquired in step S200 specifically includes the average intake-air temperature $T_{aav}$, the average air-fuel ratio $AF_{av}$, the average coolant temperature $T_{wav}$, the average oil temperature $T_{oilav}$, the average rotation speed $N_{eav}$, the average load factor $KL_{av}$, the average torque $T_{eav}$, or the average ignition timing $T_{iav}$ of the engine 12.

However, the variables input to the alcohol concentration mapping may include only a pan of the average intake-air temperature $T_{aav}$, the average air-fuel ratio $AF_{av}$, the average coolant temperature $T_{wav}$, the average oil temperature $T_{oilav}$, the average rotation speed $N_{eav}$, the average load factor $KL_{av}$, the average torque $T_{eav}$, and the average ignition timing $T_{iav}$ of the engine 12. Alternatively, instead of the average intake-air temperature $T_{aav}$, the average air-fuel ratio $AF_{av}$, the average coolant temperature $T_{wav}$, the average oil temperature $T_{oilav}$, the average rotation speed $N_{eav}$, the average load factor $KL_{av}$, the average torque $T_{eav}$, or the average ignition timing $T_{iav}$ of the engine 12, the variables may include at least a part of the intake-air temperature $T_a$, the air-fuel ratio AF, the coolant temperature $T_w$, the oil temperature $T_{oil}$, the rotation speed $N_e$, the load factor KL, the torque $T_e$, and the ignition timing $T_i$ of the engine 12.

Figure 17:
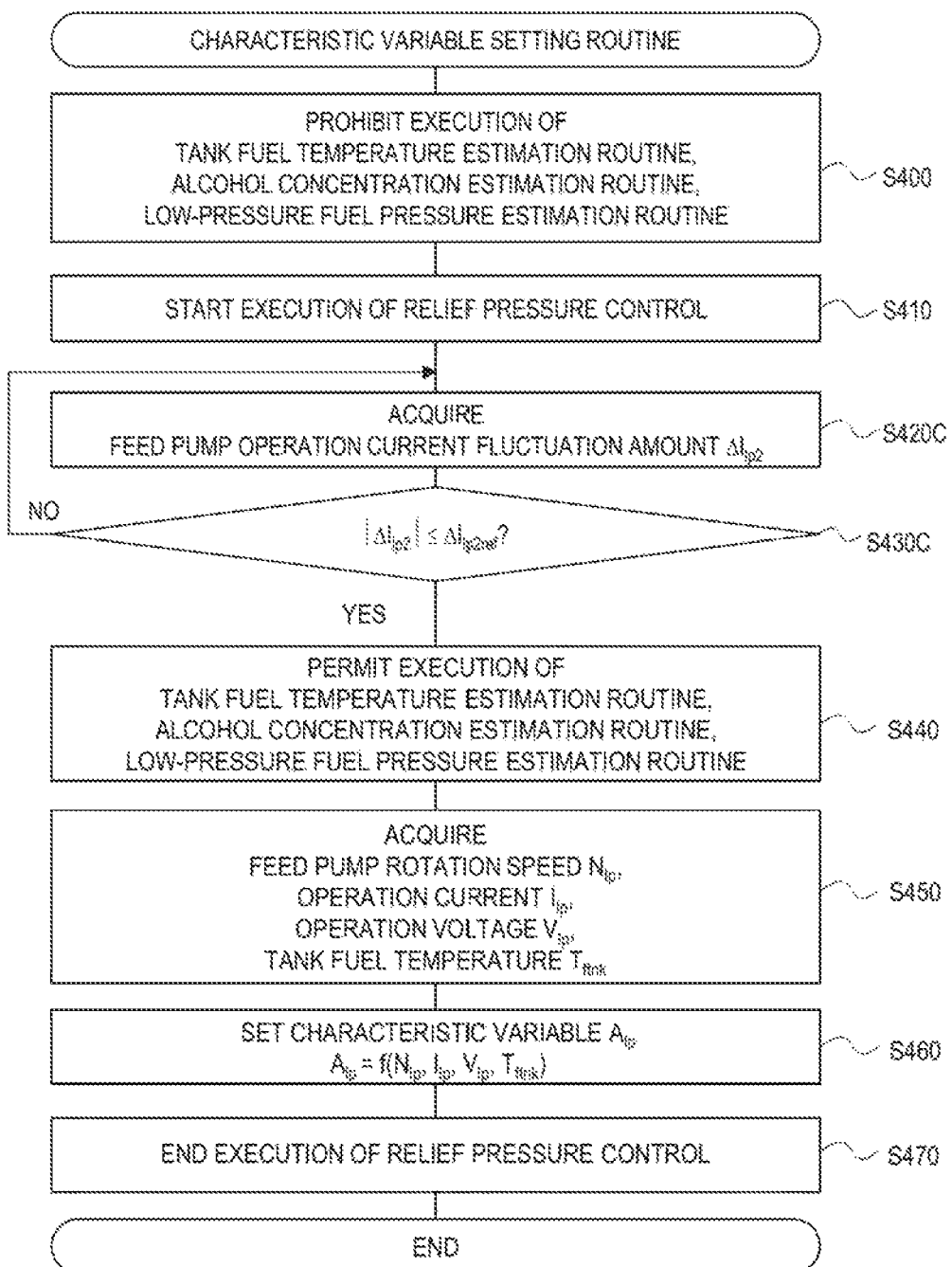
FIG. 17 is a flowchart illustrating another example of the characteristic variable setting routine.

In the vehicle 10 of the embodiment, the electronic control unit 70 executes the characteristic variable setting routine in FIG. 5. However, instead of this, the electronic control unit 70 may execute the characteristic variable setting routine in FIG. 17. The characteristic variable setting routine in FIG. 17 is the same as the characteristic variable setting routine in FIG. 5 except that the processes of steps S420 and S430 are replaced with processes of steps S420C and S430C. Therefore, in the routine in FIG. 17, the same processes as those in the routine in FIG. 5 are denoted by the same step numbers and detailed description thereof will be omitted.

In the characteristic variable setting routine in FIG. 17, when the execution of the relief pressure control in step S410 is started, the CPU 71 of the electronic control unit 70 acquires an operation current fluctuation amount $\Delta I_{lp2}$ of the feed pump 52 (step S420C). Here, for the operation current fluctuation amount $\Delta I_{lp2}$ of the feed pump 52, a value calculated as a fluctuation amount of the operation current $I_{lp}$ of the feed pump 52 per predetermined time period $\Delta t_6$ is acquired. The method of acquiring the operation current $I_{lp}$ of the feed pump 52 has been described above. As the predetermined time period $\Delta t_6$, for example, about 20 to 100 μsec is used.

Upon acquiring the data in this manner, the CPU 71 determines whether the absolute value of the operation current fluctuation amount $\Delta I_{lp2}$ of the feed pump 52 is equal to or less than a threshold value $\Delta I_{lp2ref}$ (step S430C). Here, the threshold value $\Delta I_{lp2ref}$ is used for determining whether the operation current $I_{lp}$ of the feed pump 52 has sufficiently converged. In the modified example, a condition in which the absolute value of the operation current fluctuation amount $\Delta I_{lp2}$ of the feed pump 52 becomes equal to or less than the threshold value $\Delta I_{lp2ref}$ is used as a release condition of the feed pump 52.

In step S430C, when the absolute value of the operation current fluctuation amount $\Delta I_{lp2}$ of the feed pump 52 is greater than the threshold value $\Delta I_{lp2ref}$, the CPU 71 determines that the condition for releasing the relief pressure control is not satisfied and the process returns to step S420C. Then, when the processes of steps S420C and S430C are repeatedly executed and the absolute value of the operation current fluctuation amount $\Delta I_{lp2}$ of the feed pump 52 becomes equal to or less than the threshold value $\Delta I_{lp2ref}$ in step S430C, the CPU 71 determines that the condition for releasing the relief pressure control is satisfied and the processes from step S440 are executed.

Figure 18:
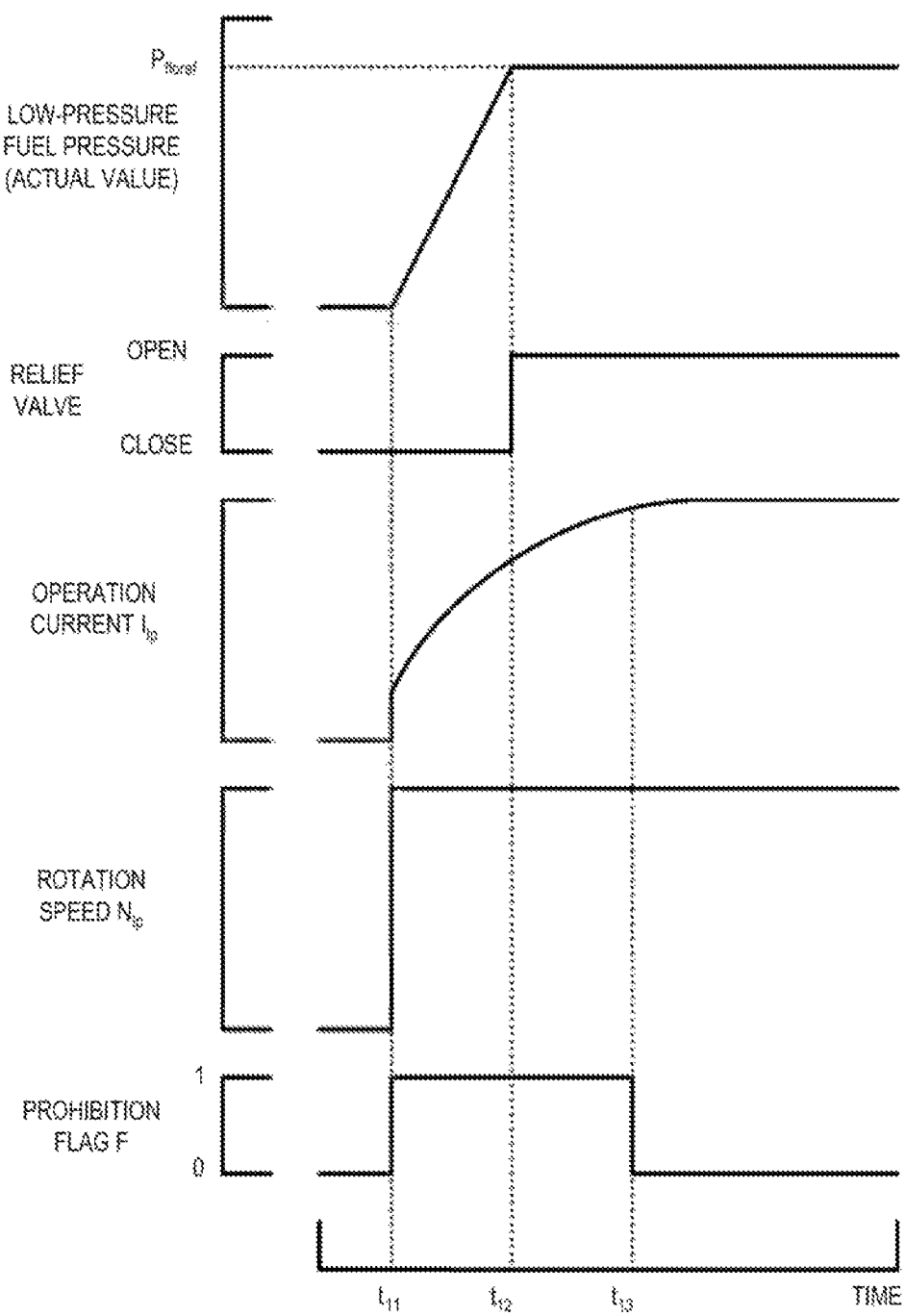
FIG. 18 is an explanatory diagram illustrating an example of statuses of a fuel pressure (an actual value) in a low-pressure supply pipe, an operation current and a rotation speed of a feed pump, and a prohibition flag at a time when the system is started after a fuel tank is refueled.

FIG. 18 is an explanatory diagram illustrating an example of statuses of the fuel pressure (an actual value) in the low-pressure supply pipe 53, the operation current lip and the rotation speed $N_{lp}$ of the feed pump 52, and a prohibition flag F at the time when the system is started after the fuel tank 51 is refueled. Here, the prohibition flag F indicates whether the execution of the tank fuel temperature estimation routine in FIG. 2, the alcohol concentration estimation routine in FIG. 3, or the low-pressure fuel pressure estimation routine in FIG. 8 is prohibited. When the system is started after the fuel tank 51 is refueled (time $t_{11}$), a value of the prohibition flag F is changed from zero to one and the execution of the relief pressure control is started. Then, when the value of the fuel pressure (the actual value) in the low-pressure supply pipe 53 becomes equal to or greater than the threshold value $P_{floref}$ (time $t_{12}$), the relief valve 56 is opened. Thereafter, when the absolute value of the operation current fluctuation amount $\Delta I_{lp2}$ of the feed pump 52 becomes equal to or less than the threshold value $\Delta I_{lp2ref}$, the CPU 71 determines that the condition for releasing the relief pressure control is satisfied, and the value of the prohibition flag F is changed from one to zero.

In the vehicle 10 of the embodiment or the modified examples, at the time when the system is started after the fuel tank 51 is refueled, the electronic control unit 70 prohibits, by the characteristic variable setting routine in FIG. 5 or 17, the execution of the tank fuel temperature estimation routine in FIG. 2, the alcohol concentration estimation routine in FIG. 3, or the low-pressure fuel pressure estimation routine in FIG. 8 until the condition for releasing the relief pressure control is satisfied. However, even during this period, the electronic control unit 70 does not have to prohibit the execution of at least a part of the routines. In other words, even during this period, the electronic control unit 70 may estimate at least a part of the tank fuel temperature $T_{ftnk}$, the alcohol concentration $C_{fal}$, and the low-pressure fuel pressure $P_{flo}$ (including the base value $P_{flobs}$ or the pulsating component $P_{flopl}$).

In the vehicle 10 of the embodiment or the modified examples, at the time when the system is started after the fuel tank 51 is refueled, the electronic control unit 70 executes the characteristic variable setting routine in FIG. 5 or 17. However, the present disclosure is not limited thereto, and for example, the electronic control unit 70 may execute the characteristic variable setting routine in FIG. 5 or 17 every time the vehicle 10 travels a predetermined distance (for example, about hundreds to thousands of km). In this case, since the fuel in the fuel tank 51 is not changed, the electronic control unit 70 does not have to prohibit the execution of the tank fuel temperature estimation routine in FIG. 2, the alcohol concentration estimation routine in FIG. 3, the high-pressure pump fuel temperature estimation routine in FIG. 7, or the low-pressure fuel pressure estimation routine in FIG. 8.

In the vehicle 10 of the embodiment, the variables input to the high-pressure pump fuel temperature mapping used for the high-pressure pump fuel temperature estimation routine in FIG. 7 include the data acquired in step S600. Here, the data acquired in step S600 includes the intake-air temperature $T_a$, the oil temperature $T_{oil}$, the rotation speed $N_e$, or the load factor KL of the engine 12, the intake flow rate $Q_{fhpi}$ of the high-pressure pump 57, the vehicle speed V, and the previously estimated high-pressure pump fuel temperature (the previous $T_{fhp}$). However, the variables input to the high-pressure pump fuel temperature mapping may include only a part of the above data.

In the vehicle 10 of the embodiment or the modified examples, the variables input to the low-pressure fuel pressure mapping (the third mapping) used for the low-pressure fuel pressure estimation routine in FIG. g include the data acquired in step S720, specifically, the rotation speed fluctuation amount $\Delta N_{lp}$, the operation current fluctuation amount $\Delta I_{lp}$, or the operation voltage fluctuation amount $\Delta V_{lp}$ of the feed pump 52, and the consumption flow rate fluctuation amount $\Delta Q_{fec}$ of the engine 12. However, the variables may include only a part of the data acquired in step S720. Alternatively, the variables may include none of the data acquired in step S720. In this case, the low-pressure fuel pressure $P_{flo}$ is estimated without considering the overshoot amount of the base value of the fuel pressure in the low-pressure supply pipe 53.

In the vehicle 10 of the embodiment or the modified examples, the variables input to pulsating mapping (the first mapping) used for the low-pressure fuel pressure estimation routine in FIG. 8 include the data acquired in step S710, specifically, the present and past cam angles $\theta_{ci}$, $\theta_{ci1}$, $\theta_{ci2}$, the present and past rotation speeds $N_e$, $N_{e1}$, $N_{e2}$, or the present and past load factors KL, $KL_1$, $KL_2$ of the engine 12, the present and past discharge flow rates $Q_{fhpo}$, $Q_{fhpo1}$, $Q_{fhpo2}$ of the high-pressure pump 57, and the present and past high-pressure fuel pressures $P_{fhi}$, $P_{fhi1}$, $P_{fhi2}$.

However, the variables may include the present and past cam angles $\theta_{ci}$, $\theta_{ci1}$, $\theta_{ci2}$. The variables do not have to include the present and past rotation speeds $N_e$, $N_{e1}$, $N_{e2}$, do not have to include the present and past load factors KL, $KL_1$, $KL_2$, do not have to include the present and past discharge flow rates $Q_{fhpo}$, $Q_{fhpo1}$, $Q_{fhpo2}$ of the high-pressure pump 57, and do not have to include the present and past high-pressure fuel pressures $P_{fhi}$, $P_{fhi1}$, $P_{fhi2}$.

Further, the number of pieces of past data on the cam angle $\theta_{ci}$, the rotation speed $N_e$, the load factor KL, the discharge flow rate $Q_{fhpo}$, or the high-pressure fuel pressure $P_{fhi}$ is not limited to two, and may be one, or three or more.

In the vehicle 10 of the embodiment or the modified examples, the variables input to the base value mapping (the second mapping) used for the low-pressure fuel pressure estimation routine in FIG. 8 include the data acquired in step S700, specifically, the rotation speed $N_{lp}$, the operation current $I_{lp}$, the operation voltage $V_{lp}$, or the characteristic variable $A_{lp}$ of the feed pump 52, the consumption flow rate $Q_{fec}$ of the engine 12, the tank fuel temperature $T_{ftnk}$, the alcohol concentration $C_{fal}$ of the fuel, the tank internal pressure $P_{tnk}$, the pressure loss $L_{lo}$ of the low-pressure supply pipe 53, and the high-pressure pump fuel temperature $T_{fhp}$.

However, the variables may include, as a value associated with the rotation speed $N_{lp}$ of the feed pump 52, any of the target discharge flow rate $Q_{flpo}^*$, the target rotation speed $N_{lp}^*$, and the target duty $D_{lp}^*$, which are used for controlling the feed pump 52. The variables do not have to include the operation voltage $V_{lp}$ of the feed pump 52. The variables do not have to include the characteristic variable $A_{lp}$ of the feed pump 52.

Alternatively, the variables may include neither the tank fuel temperature $T_{ftnk}$ nor the alcohol concentration $C_{fal}$ of the fuel. Instead of the tank fuel temperature $T_{ftnk}$, the variables may include at least a part of the rotation speed fluctuation amount $\Delta N_{lp}$ of the feed pump 52, the intake-air temperature fluctuation amount $\Delta T_a$, the air-fuel ratio fluctuation amount $\Delta AF$, the coolant temperature fluctuation amount $\Delta T_w$, and the rotation speed fluctuation amount $\Delta N_e$ of the engine 12, the outside air temperature fluctuation amount $\Delta T_{out}$, the average fuel amount $Q_{ftnkav}$ in the fuel tank 51, the average rotation speed $N_{rfav}$ of the radiator fan 62, and the average vehicle speed $V_{av}$, all of which are used for estimating the tank fuel temperature $T_{ftnk}$. Instead of the alcohol concentration $C_{fal}$, the variables may include at least a part of the average intake-air temperature $T_{aav}$, the average air-fuel ratio $AF_{av}$, the average coolant temperature $T_{wav}$, the average oil temperature $T_{oilav}$, the average rotation speed $N_{eav}$, the average load factor $KL_{av}$, the average torque $T_{eav}$, and the average ignition timing $T_{iav}$ of the engine 12, which are used for estimating the alcohol concentration $C_{fal}$.

Alternatively, the variables do not have to include the tank internal pressure $P_{tnk}$. Instead of the tank internal pressure $P_{tnk}$, the variables may include the fuel amount $Q_{ftnk}$ in the fuel tank 51, which is used for estimating the tank internal pressure $P_{tnk}$. The variables do not have to include the characteristic variable $A_{lp}$. The variables may include at least a part of the rotation speed $N_{lp}$, the operation current $I_{lp}$, and the operation voltage $V_{lp}$ of the feed pump 52, and the tank fuel temperature $T_{ftnk}$ at the time when the condition for releasing the relief pressure control is satisfied, all of which are the values used for setting the characteristic variable $Al_p$. The variables do not have to include the pressure loss $L_{lo}$ of the low-pressure supply pipe 53. The variables do not have to include the high-pressure pump fuel temperature $T_{fhp}$. Instead of the high-pressure pump fuel temperature $T_{fhp}$, the variables may include at least a part of the intake-air temperature $T_a$, the oil temperature $T_{oil}$, the rotation speed $N_e$, and the load factor KL of the engine 12, the intake flow rate $Q_{fhpi}$ of the high-pressure pump 57, and the vehicle speed V, all of which are used for estimating the high-pressure pump fuel temperature $T_{fhp}$.

Figure 19:
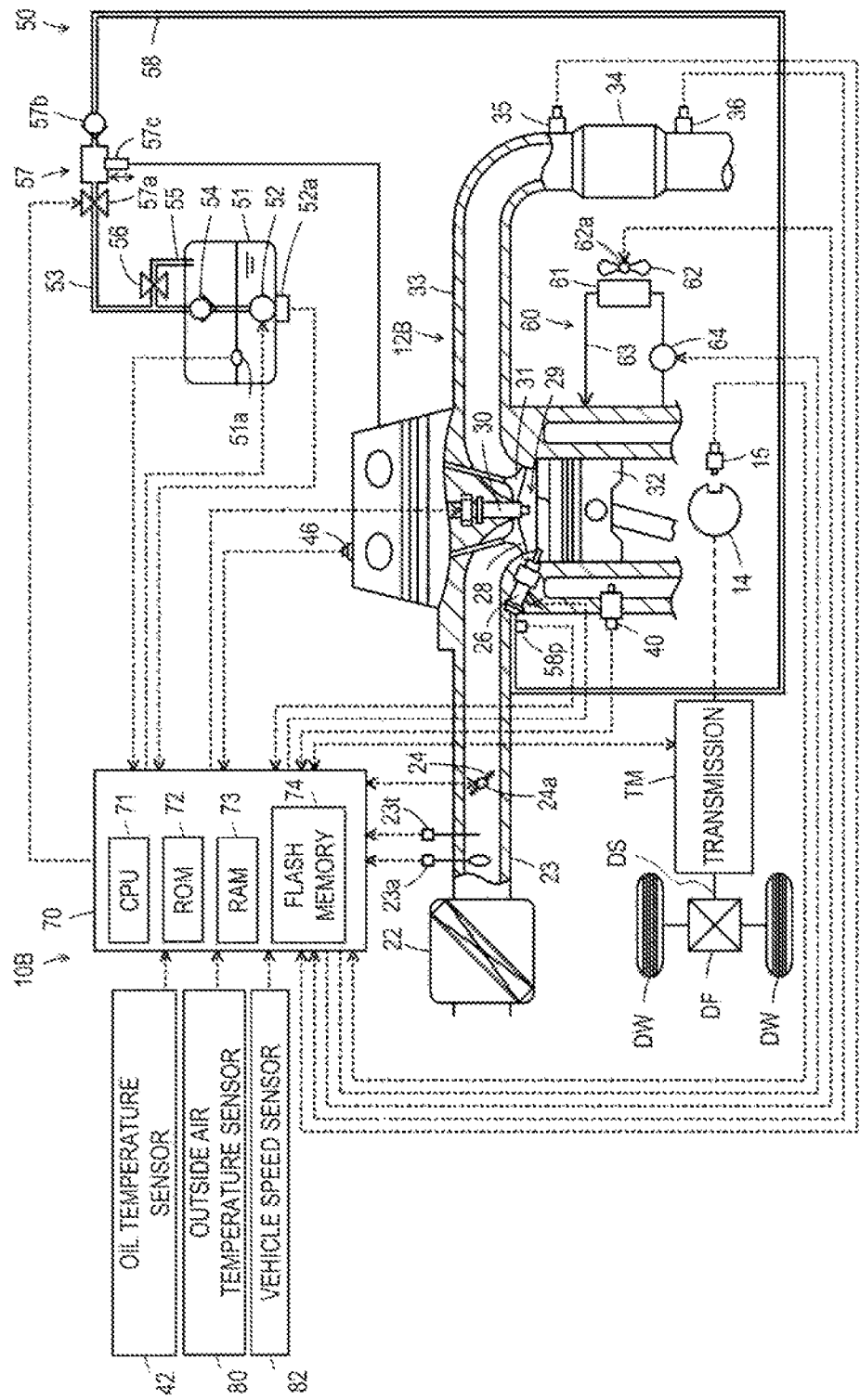
FIG. 19 is a block diagram illustrating a schematic configuration of a second vehicle.

In the vehicle 10 of the embodiment or the above-described modified examples, as illustrated in FIG. 1, the engine 12 is provided with the port injection valve and the cylinder injection valve 26. However, as illustrated in the vehicle 10B in FIG. 19, an engine 12B does not have to be provided with the port injection valve 25. In the hardware configuration of the vehicle 10B, in the same manner as in the embodiment or the above-described modified examples, the electronic control unit 70 executes the tank fuel temperature estimation routine in FIG. 2, the alcohol concentration estimation routine in FIG. 3, the tank internal pressure estimation routine in FIG. 4, the characteristic variable setting routine in FIG. 5, the pressure loss estimation routine in FIG. 6, the high-pressure fuel pressure estimation routine in FIG. 7, the low-pressure fuel pressure estimation routine in FIG. 8, or the like. As such, the tank fuel temperature $f_{tnk}$, the alcohol concentration $C_{fal}$, the tank internal pressure $P_{tnk}$, the characteristic variable $A_{lp}$ of the feed pump 52, the pressure loss $L_{lo}$ of the low-pressure supply pipe 53, the high-pressure fuel pressure $P_{fhi}$, the base value $P_{flobs}$, the pulsating component $P_{flopl}$, or the low-pressure fuel pressure $P_{flo}$ can be estimated.

In the vehicles 10, 10B of the embodiment or the above-described modified examples, the electronic control unit 70 estimates the tank fuel temperature $T_{ftnk}$ using the tank fuel temperature mapping. However, the vehicles 10, 10B may be provided with the fuel temperature sensor 51t (see FIG. 10).

In the vehicles 10, 10B of the embodiment or the above-described modified examples, the electronic control unit 70 estimates the alcohol concentration $C_{fal}$ of the fuel using the alcohol concentration mapping. However, the vehicles 10, 10B may be provided with the alcohol concentration sensor 51c (see FIG. 10).

In the vehicles 10, 10B of the embodiment or the above-described modified examples, the electronic control unit 70 estimates the tank internal pressure $P_{tnk}$ using the tank internal pressure mapping. However, the vehicles 10, 10B may be provided with the internal pressure sensor 51c (see FIG. 10).

In the vehicles 10, 10B of the embodiment or the above-described modified examples, the electronic control unit 70 estimates the high-pressure pump fuel temperature $T_{fhp}$ using the high-pressure pump fuel temperature mapping. However, the vehicles 10, 10B may be provided with the fuel temperature sensor 58t (see FIG. 10).

Figure 20:
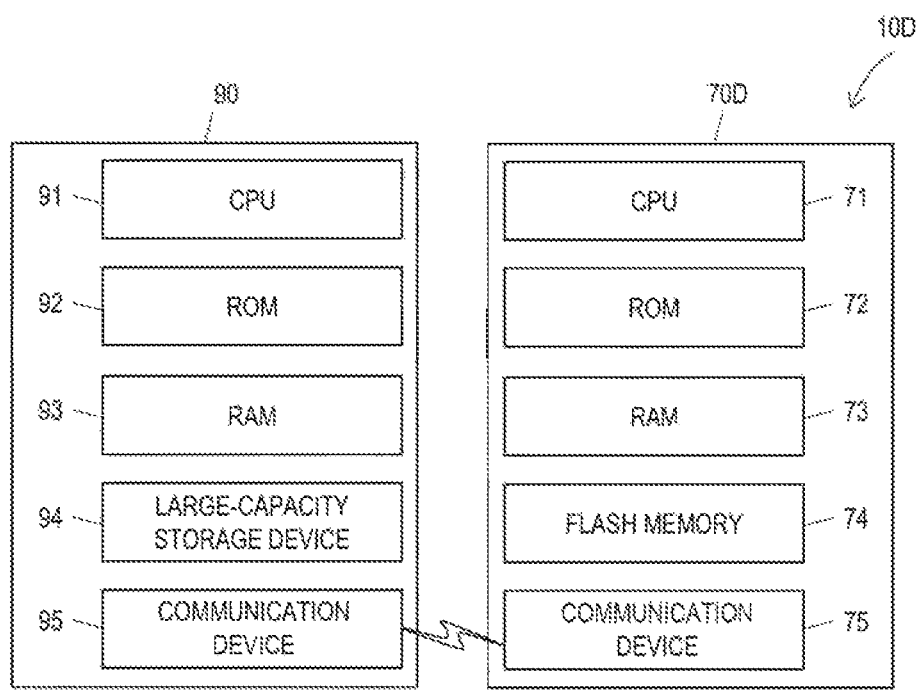
FIG. 20 includes block diagrams illustrating schematic configurations of an electronic control unit mounted on a third vehicle, and a server arranged outside the vehicle.

In the vehicle 10 of the embodiment or the above-described modified examples, the electronic control unit 70 estimates the tank fuel temperature $T_{ftnk}$, the alcohol concentration $C_{fal}$, the tank internal pressure $P_{tnk}$, the characteristic variable $A_{lp}$, the pressure loss $L_{lo}$ of the low-pressure supply pipe 53, or the like, using the tank fuel temperature mapping, the alcohol concentration mapping, the tank internal pressure mapping, the characteristic variable mapping, or the pressure loss mapping. Further, the electronic control unit 70 estimates the base value $P_{flobs}$, the pulsating component $P_{flopl}$, or the low-pressure fuel pressure $P_{flo}$ using the base value mapping (the second mapping), the pulsating mapping (the first mapping), or the low-pressure fuel pressure mapping (the third mapping). The same applies to the vehicles 10B. However, these estimations may be executed outside the vehicle. FIG. 20 includes block diagrams illustrating schematic configurations of an electronic control unit 70D mounted on a vehicle 10D and a server 90 arranged outside the vehicle. The vehicle 10D is configured in the same manner as any of the vehicles 10, 10B. The "fuel pressure estimation system" of the modified example corresponds to the electronic control unit 70D and the server 90, a "control device of the fuel supply device" corresponds to the electronic control unit 70D, and a "data analysis device" corresponds to the server 90.

The electronic control unit 70D of the vehicle 10D is provided with a communication device 75 in addition to the CPU 71, the ROM 72, the RAM 73, or the flash memory 74, which are the same as those provided in the electronic control unit 70 of the vehicle 10 of the embodiment and the like. The flash memory 74 of the vehicle 10D does not store each mapping (the low-pressure fuel pressure mapping and the like) stored in the flash memory 74 of the vehicles 10, 10B. The vehicle 10D does not have to be provided with the flash memory 74. The communication device 75 communicates with the server 90 via a network.

The server 90 is configured to analyze data from each vehicle including the vehicle 10D. The server 90 is provided with a CPU 91, a ROM 92, a RAM 93, a large-capacity storage device (for example, an HDD, an SSD, or the like) 94, and a communication device 95. The large-capacity storage device 94 stores each mapping (the low-pressure fuel pressure mapping and the like) stored in the flash memory 74 of the vehicles 10, 10B. The communication device 95 communicates with each vehicle including the vehicle 10D via the network.

FIG. 21 is a flowchart illustrating an example of a flow of processing the electronic control unit 70D and the server 90 when estimating the tank fuel temperature $T_{ftnk}$. As illustrated in FIG. 21, the electronic control unit 70D of the vehicle 10D first acquires the same data as that acquired in the processes of steps S100 and S110 of the tank fuel temperature estimation routine in FIG. 2 (steps S800 and S810) and sends, to the server 90, the acquired data together with a vehicle ID, which is an identification number of the vehicle 10D (step S820).

Upon receiving the data from the vehicle 10D (step S830), the server 9W estimates the tank fuel temperature $T_{ftnk}$ using the received data and the tank fuel temperature mapping in the same manner as the process of step S120 of the tank fuel temperature estimation routine in FIG. 2 (step S940), and sends the estimated tank fuel temperature $T_{ftnk}$ to the vehicle 10D (step S850). Then, the vehicle 10D receives the tank fuel temperature $T_{ftnk}$ (step S860), and then this series of flows are ended. Using this series of processes, processing loads on the CPU 71 of the vehicle 10D can be reduced.

In FIG. 21, the flow of processing the electronic control unit 70D and the server 90 when estimating the tank fuel temperature $T_{ftnk}$ has been described. The flow of processing the electronic control unit 70D and the server 90 when estimating the alcohol concentration $C_{fal}$, the tank internal pressure $P_{tnk}$, the characteristic variable $A_{lp}$, the pressure loss $L_{lo}$, the base value $P_{flobs}$, the pulsating component $P_{flopl}$, the low-pressure fuel pressure $P_{flo}$, or the like can be considered in the same manner. In other words, the electronic control unit 70D acquires various pieces of data and sends them to the server 90, the server 90 receives the various pieces of data from the electronic control unit 70D, estimates the alcohol concentration $C_{fal}$, the tank internal pressure $P_{tnk}$, the characteristic variable $A_{lp}$, the pressure loss $L_{lo}$, the base value $P_{flobs}$, the pulsating component $P_{flopl}$, the low-pressure fuel pressure $P_{flo}$, or the like, and sends it to the electronic control unit 70D, and the electronic control unit 70D receives the alcohol concentration $C_{fal}$, the tank internal pressure $P_{tnk}$, the characteristic variable $A_{lp}$, the pressure loss $L_{lo}$, the base value $P_{flobs}$, the pulsating component $P_{flopl}$, the low-pressure fuel pressure $P_{flo}$, or the like.

As illustrated in FIG. 20, the form of the fuel pressure estimation system including the electronic control unit 70D mounted on the vehicle 10D and the server 9) arranged outside the vehicle has been described. However, the server 90 may be in the form of the data analysis device used in this fuel pressure estimation system, and the electronic control unit 70D may be in the form of the control device of the fuel supply device 50 used in the fuel pressure estimation system.

In the embodiment or the above-described modified examples, each mapping, such as the tank fuel temperature mapping, the alcohol concentration mapping, the tank pressure mapping, the high-pressure pump fuel temperature mapping, the base value mapping (the second mapping), the pulsating mapping (the first mapping), or the low-pressure fuel pressure mapping (the third mapping), is generated using a neural network as a machine learning method. However, each mapping may be generated using a method other than a neural network, for example, a random forest, a support vector machine, and a long short-term memory (LSTM). Further, each mapping may be generated as a map, an arithmetic expression, or the like through experiments, analysis, or the like by humans.

In the embodiment or the above-described modified examples, the characteristic variable mapping or the pressure loss mapping is determined as maps, arithmetic expressions, or the like through experiments, analysis, or the like by humans. However, it may be determined by machine learning.

In the embodiment or the above-described modified examples, as the temperature of the fuel, the tank fuel temperature $T_{ftnk}$ or the high-pressure pump fuel temperature $T_{fhp}$ is estimated. However, instead of the tank fuel temperature $T_{ftnk}$, the temperature of the fuel in the low-pressure supply pipe 53 may be estimated.

In the embodiment or the above-described modified examples, as the fuel type, the alcohol concentration $C_{fal}$ is estimated. However, in addition to or instead of the alcohol concentration $C_{fal}$, for example, viscosity $\eta f$ may be estimated.

The correspondence between the main elements in the embodiment and those described in the SUMMARY will be described. In the embodiment, the engine 12 corresponds to the "engine", the fuel supply device 50 corresponds to the "fuel supply device", the electronic control unit 70 corresponds to the "fuel pressure estimation system", the flash memory 74 corresponds to the "storage device", and the CPU 71 corresponds to the "execution device".

The correspondence between the main elements in the embodiment and those described in the SUMMARY is an example intended to specifically describe the form in which the present disclosure is implemented in the SUMMARY, and thus is not limited to the elements of the present disclosure described in the SUMMARY. In other words, the present disclosure described in the SUMMARY should be interpreted based on the description therein, and the embodiment is merely a specific example of the present disclosure described in the SUMMARY.

Although the form in which the present disclosure is implemented has been described above using the embodiment, the present disclosure is not limited thereto, and can be implemented in various forms within a range not departing from the scope of the present disclosure.

The present disclosure can be used in the manufacturing industry of fuel pressure estimation systems and the like.

What is claimed is:

1. A fuel pressure estimation system, the fuel pressure estimation system being configured to estimate a pulsating variable on a pulsating component of a low-pressure fuel pressure, which is a pressure of fuel in a low-pressure supply pipe for an engine apparatus including a cylinder injection valve that injects fuel in a cylinder, and a fuel supply device that has a fuel pump and a high-pressure pump, the fuel pump supplying fuel in a fuel tank to the low-pressure supply pipe and the high-pressure pump pressurizing the fuel in the low-pressure supply pipe by a plunger, which is driven according to rotation of a cam, and supplying the fuel to a high-pressure supply pipe connected to the cylinder injection valve, and comprising:

a storage device configured to store a first mapping that receives, as an input, a first input variable including a cam phase variable on present and past phases of the cam, and outputs the pulsating variable on the pulsating component; and an execution device configured to acquire the first input variable and estimate the pulsating variable by applying the first input variable to the first mapping.

2. The fuel pressure estimation system according to claim 1, wherein the first input variable further includes at least a part of an engine rotation speed variable on present and past rotation speeds of an engine, a load factor variable on present and past load factors of the engine, a high-pressure discharge flow rate variable on present and past discharge flow rates of the high-pressure pump, and a high-pressure fuel pressure variable on present and past fuel pressures in the high-pressure supply pipe.

3. The fuel pressure estimation system according to claim 1, wherein:

the storage device is configured to further store a second mapping that receives, as an input, second input variables including a pump variable on a state of the fuel pump, a consumption flow rate variable on a consumption flow rate of the fuel of the engine, and a property variable on a property of the fuel, and outputs a base value variable on a base value of the low-pressure fuel pressure; and the execution device is configured to acquire the second input variables and estimate the base value variable by applying the second input variables to the second mapping.

4. The fuel pressure estimation system according to claim 3, wherein the second input variables include at least one of a fuel amount variable on a fuel amount in the fuel tank, an internal pressure variable on a tank internal pressure, which is a pressure in the fuel tank, a relief pressure-associated variable, which is the pump variable and the property variable when a relief pressure control for driving the fuel pump such that a relief valve is opened is executed, a characteristic variable on a characteristic of the fuel pump, and a pressure loss variable on a pressure loss of the fuel in the low-pressure supply pipe.

5. The fuel pressure estimation system according to claim 3, wherein:

the storage device is configured to store a third mapping that receives, as an input, at least the base value variable and the pulsating variable, and outputs a low-pressure fuel pressure variable on a behavior of the low-pressure fuel pressure including the base value and the pulsating component of the low-pressure fuel pressure; and the execution device is configured to estimate the low-pressure fuel pressure variable by applying at least the base value variable and the pulsating variable to the third mapping.

6. The fuel pressure estimation system according to claim 1, wherein:

the execution device includes a first execution device mounted on a vehicle and a second execution device arranged outside the vehicle;

the first execution device is configured to acquire acquisition data including the first input variable, send the acquisition data to the second execution device, and receive estimation data from the second execution device; and the second execution device is configured to receive the acquisition data, estimate, from the acquisition data, the estimation data including a fuel pressure variable, and send the estimation data to the first execution device.

* * * * *